(12) United States Patent
Ohta et al.

(10) Patent No.: US 9,451,610 B2
(45) Date of Patent: Sep. 20, 2016

(54) WIRELESS TERMINAL AND BASE STATION

(71) Applicant: FUJITSU LIMITED, Kawasaki-shi, Kanagawa (JP)

(72) Inventors: Yoshiaki Ohta, Yokohama (JP); Yoshihiro Kawasaki, Kawasaki (JP); Yoshiharu Tajima, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/177,831

(22) Filed: Feb. 11, 2014

(65) Prior Publication Data

US 2014/0161069 A1 Jun. 12, 2014

Related U.S. Application Data

(63) Continuation of application No. PCT/JP2011/071024, filed on Sep. 14, 2011.

(51) Int. Cl.
*H04W 4/00* (2009.01)
*G06F 11/10* (2006.01)
*H04W 72/04* (2009.01)
*H04W 72/12* (2009.01)
*H04L 5/00* (2006.01)
(Continued)

(52) U.S. Cl.
CPC ............ *H04W 72/0433* (2013.01); *H04L 5/00* (2013.01); *H04L 5/0053* (2013.01); *H04W 72/1263* (2013.01); *H04W 76/00* (2013.01); *H04L 1/1861* (2013.01)

(58) Field of Classification Search
CPC ........... H04W 72/0433; H04W 76/00; H04W 72/1263; H04L 5/0053; H04L 5/00; H04L 1/1861
See application file for complete search history.

(56) References Cited

U.S. PATENT DOCUMENTS

2011/0083066 A1* 4/2011 Chung .................. H03M 13/09
714/807
2012/0176996 A1* 7/2012 Kim .................. H04W 72/0413
370/329

FOREIGN PATENT DOCUMENTS

JP 2010-158000 A 7/2010
JP 2010-232742 A 10/2010

OTHER PUBLICATIONS

3GPP TS 36.321 V10.1.0; 3rd Generation Partnership Project; Technical Specification Group Radio Access Network; Evolved Universal Terrestrial Radio Access (E-ETRA); Medium Access Control (MAC) protocol specification (Release 10); Mar. 2011.
(Continued)

*Primary Examiner* — Kiet Tang
(74) *Attorney, Agent, or Firm* — Fujitsu Patent Center

(57) ABSTRACT

A communicating unit of a base station performs a plurality of periodic communication services with a wireless terminal. A communication control unit of the base station includes, in a control channel, identification information for distinguishing the periodic communication services one from the other to thereby allow the wireless terminal to control at least one of activation and release of each of the periodic communication services. A communicating unit of the wireless terminal performs the plurality of periodic communication services with the base station. A communication control unit of the wireless terminal controls at least one of the activation and the release of each of the periodic communication services using the identification information included in the control channel transmitted from the base station.

9 Claims, 29 Drawing Sheets

(51) Int. Cl.
*H04W 76/00* (2009.01)
*H04L 1/18* (2006.01)

(56) References Cited

OTHER PUBLICATIONS

3GPP TS 36.213 V10.1.0; 3rd Generation Partnership Project; Technical Specification Group Radio Access Network; Evolved Universal Terrestrial Radio Access (E-ETRA); Physical layer procedures (Release 10); Mar. 2011.
3GPP TR 36.913 V9.0.0; 3rd Generation Partnership Project; Technical Specification Group Radio Access Network; Requirements for further advancements for Evolved Universal Terrestrial Radio Access (E-UTRA) (LTE-Advanced) (Release 9); Dec. 2009.
3GPP TR 36.912 V9.3.0; 3rd Generation Partnership Project; Technical Specification Group Radio Access Network; Feasibility study for Further Advanements for E-UTRA (LTE-Advanced) (Release 9); Jun. 2010.
3GPP TS 36.300 V10.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); Mar. 2011.
Panasonic; "Scheduling aspects for carrier aggregation", Agenda Item: 7.3.1; 3GPP TSG RAN WG2 #68bis; R2-100231; Valencia, Spain; Jan. 18-22, 2010.
Nokia Siemens Networks et al.; CA and SPS; Agenda item: 7.1.3; 3GPP TSG-RAN WG2 Meeting #68bis; R2-100055; Valencia, Spain; Jan. 18-22, 2010.
CATT; Consideration on SPS in CA; Agenda Item: 7.1.8; 3GPP TSG RAN WG2 Meeting #68; R2-101057; San Francisco, USA; Feb. 22-26, 2010.
International Search Report, mailed in connection with PCT/JP2011/071024 and mailed Dec. 20, 2011.

* cited by examiner

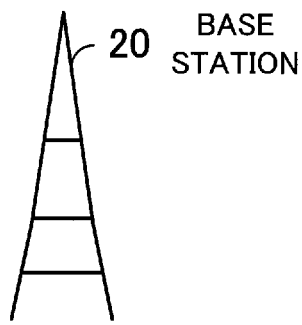
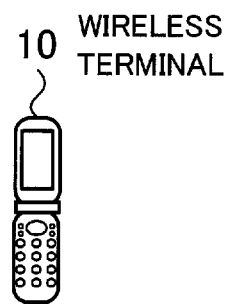
FIG. 2

| | DCI format 1/1A (ACTIVATION, MIMO NOT APPLIED) | DCI format 2/2A/2B/2C (ACTIVATION, MIMO APPLIED) | DCI format 1A (RELEASE) |
|---|---|---|---|
| NDI | 0 | 0 | 0 |
| HARQ process number | FDD: set to '000'<br>TDD: set to '0000' | FDD: set to '000'<br>TDD: set to '0000' | FDD: set to '000'<br>TDD: set to '0000' |
| Modulation and coding scheme | MSB is set to '0' | For the enabled transport block: MSB is set to '0' | set to '1111' |
| Redundancy version | set to '00' | For the enabled transport block: set to '00' | set to '00' |
| Resource block assignment | N/A | N/A | set to all '1's |

FIG. 7

| | DCI format 0 (ACTIVATION) | DCI format 0 (RELEASE) |
|---|---|---|
| NDI | 0 | 0 |
| TPC command for scheduled PUSCH | set to '00' | set to '00' |
| Cyclic shift DM RS | set to '000' | set to '000' |
| Modulation and coding scheme and redundancy version | MSB is set to '0' | set to '11111' |
| Resource block assignment and hopping resource allocation | N/A | set to all '1's |

FIG. 8

|  | DCI format 1/1A (ACTIVATION, MIMO NOT APPLIED) | DCI format 2/2A/2B/2C (ACTIVATION, MIMO APPLIED) | DCI format 1A (RELEASE) |
|---|---|---|---|
| NDI | 0 | 0 | 0 |
| SPS Index | 3-BIT BITMAP | 3-BIT BITMAP | 3-BIT BITMAP |
| Modulation and coding scheme | MSB is set to '0' | For the enabled transport block: MSB is set to '0' | set to '11111' |
| Redundancy version | set to '00' | For the enabled transport block: set to '00' | set to '00' |
| Resource block assignment | N/A | N/A | set to all '1' s |

FIG. 10

| | DCI format 0 (ACTIVATION) | DCI format 0 (RELEASE) |
|---|---|---|
| NDI | 0 | 0 |
| TPC command for scheduled PUSCH | set to '00' | set to '00' |
| SPS Index | 3-BIT BITMAP | 3-BIT BITMAP |
| Modulation and coding scheme and redundancy version | MSB is set to '0' | set to '11111' |
| Resource block assignment and hopping resource allocation | N/A | set to all '1's |

FIG. 11

| | DCI format 1/1A (ACTIVATION, MIMO NOT APPLIED) | DCI format 2/2A/2B/2C (ACTIVATION, MIMO APPLIED) | DCI format 1A (RELEASE) |
|---|---|---|---|
| CIF | 3-BIT BITMAP | 3-BIT BITMAP | 3-BIT BITMAP |
| NDI | 0 | 0 | 0 |
| HARQ process number | FDD: set to '000' TDD: set to '0000' | FDD: set to '000' TDD: set to '0000' | FDD: set to '000' TDD: set to '0000' |
| Modulation and coding scheme | MSB is set to '0' | For the enabled transport block: MSB is set to '0' | set to '1111' |
| Redundancy version | set to '00' | For the enabled transport block: set to '00' | set to '00' |
| Resource block assignment | N/A | N/A | set to all '1's |

FIG. 22

|  | DCI format 0 (ACTIVATION) | DCI format 0 (RELEASE) |
|---|---|---|
| CIF | 3-BIT BITMAP | 3-BIT BITMAP |
| NDI | 0 | 0 |
| TPC command for scheduled PUSCH | set to '00' | set to '00' |
| Cyclic shift DM RS | set to '000' | set to '000' |
| Modulation and coding scheme and redundancy version | MSB is set to '0' | set to '11111' |
| Resource block assignment and hopping resource allocation | N/A | set to all '1's |

FIG. 23

WIRELESS TERMINAL AND BASE STATION

CROSS-REFERENCE TO RELATED APPLICATION

This application is a continuation application of International Application PCT/JP2011/071024 filed on Sep. 14, 2011 which designated the U.S., the entire contents of which are incorporated herein by reference.

FIELD

The embodiments discussed herein are related to a wireless terminal and a base station for communicating wirelessly.

BACKGROUND

Cellular mobile communication has evolved from the Universal Mobile Telecommunication System (UMTS) to the Long Term Evolution (LTE). The LTE uses an Orthogonal Frequency Division Multiplexing (OFDM) based scheme as a wireless access technology. The LTE enables high-speed wireless packet communication at peak data rates of 100 Mbps or more in the downlink (DL) and 50 Mbps or more in the uplink (UL).

The 3rd Generation Partnership Project (3GPP), an international standardization organization, has started examining an LTE-based mobile communication system, LTE-Advanced (LTE-A), to implement even higher speed communication. The LTE-A targets high peak data rates of 1 Gbps in the downlink and 500 Mbps in the uplink, and various new techniques including wireless access schemes and network architectures have currently been studied.

For the LTE-A, two scheduling schemes have been proposed: dynamic scheduling and Semi-Persistent Scheduling (SPS). In dynamic scheduling, radio resource allocation for the uplink and for the downlink is signaled through the Physical Downlink Control Channel (PDCCH). In SPS, a base station informs in advance a wireless terminal of communication periodicity in a radio resource control (RRC) connection on Layer 3 (L3). Then, when actual SPS communication is performed, the base station transmits an activation command to the wireless terminal through the PDCCH. The SPS activation command includes information indicating which radio resources are to be continuously used (see, for example, 3GPP TS 36.321, "Medium Access Control (MAC) protocol specification", V10.1.0, Release 10, March 2011; and 3GPP TS 36.213, "Physical layer procedures", V10.1.0, Release 10, March 2011).

SPS is used in real-time communication represented, for example, by Voice over Internet Protocol (VoIP). Assume for example that, in a VoIP service, data is sent at 20-ms intervals. In this case, in SPS, the base station informs the wireless terminal of a communication periodicity of 20 ms when an RRC connection is established. Then, when starting SPS communication, the base station transmits an activation command through the PDCCH to thereby inform the wireless terminal of radio resources to be used for the SPS communication.

Thus, in SPS, the base station informs in advance the wireless terminal of the communication periodicity and, then, specifies radio resources allocated for the communication using the PDCCH at the start of the communication. With this, SPS avoids the need to transmit downlink assignments and uplink grants through the PDCCH in the following periodic communication. That is, SPS enables data packets of small size to be transmitted over the Physical Downlink Shared Channel (PDSCH), thus reducing the signaling overhead of the PDCCH.

However, SPS allows only one periodicity to be configured, thus being unable to control more than one communication service.

SUMMARY

According to one aspect, there is provided a wireless terminal for wirelessly communicating with a base station. The wireless terminal includes a communicating unit configured to perform a plurality of periodic communication services with the base station; and a communication control unit configured to control at least one of activation and release of each of the periodic communication services using identification information for distinguishing the periodic communication services one from the other. The identification information is included in a control channel transmitted from the base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a wireless communication system according to a second embodiment;
FIG. 7 illustrates formats for downlink SPS activation and release;
FIG. 8 illustrates formats for uplink SPS activation and release;
FIG. 10 illustrates formats for downlink SPS activation and release;
FIG. 11 illustrates formats for uplink SPS activation and release;
FIG. 22 illustrates formats for downlink SPS activation and release according to a fourth embodiment;

FIG. 23 illustrates formats for uplink SPS activation and release according to the forth embodiment;

DESCRIPTION OF EMBODIMENTS

Figure 1:
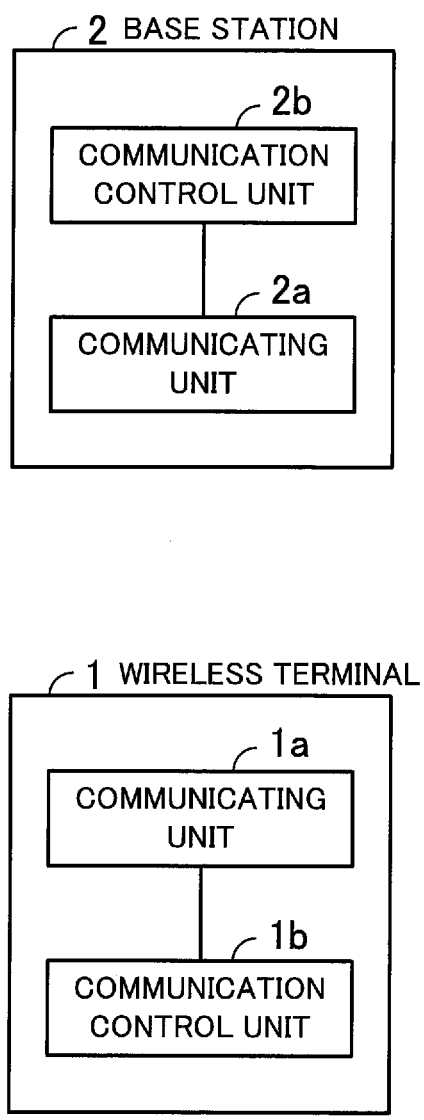
FIG. 1 illustrates a wireless communication system according to a first embodiment.

Several embodiments will be described below with reference to the accompanying drawings, wherein like reference numerals refer to like elements throughout.

(a) First Embodiment

FIG. 1 illustrates a wireless communication system according to a first embodiment. As illustrated in FIG. 1, the wireless communication system includes a wireless terminal 1 and a base station 2. The wireless terminal 1 includes a communicating unit 1a and a communication control unit 1b, and the base station 2 includes a communicating unit 2a and a communication control unit 2b.

The communicating unit 2a of the base station 2 performs a plurality of periodic communication services with the wireless terminal 1. For example, the communicating unit 2a is capable of performing a plurality of SPS services with the wireless terminal 1. More specifically, the communicating unit 2a is capable of establishing three SPS services with the wireless terminal 1 and communicating data having a different attribute in each of the three SPS services.

The communication control unit 2b includes, in a control channel, service identifying information for distinguishing the plurality of periodic communication services of the communicating unit 2a one from the other to thereby allow the wireless terminal 1 to control at least one of activation and release of each of the periodic communication services.

The control channel is, for example, the PDCCH. The PDCCH includes, for example, a 3-bit field for managing a Hybrid Automatic Repeat Request (HARQ) process number. Note that for activation of SPS, the 3-bit field of the HARQ process number is usually set to '000'. However, using the HARQ process number field to distinguish a plurality of SPS services one from the other, the communication control unit 2b causes the individual SPS services to be activated. Specifically, the communication control unit 2b uses the 3-bit HARQ process number field as a bitmap. Each of the three bits is associated with one of the three SPS services to thereby distinguish the three SPS services one from the other.

Assume here that three SPS services SPS1 to SPS3 correspond one-to-one with the three bits of the bitmap. In order to cause SPS1 to be activated, for example, the communication control unit 2b sets the HARQ process number field of the PDCCH to '001'. To cause SPS2 and SPS3 to be activated, for example, the communication control unit 2b sets the HARQ process number field of the PDCCH to '110'. To cause SPS1 and SPS3 to be activated, for example, the communication control unit 2b sets the HARQ process number field of the PDCCH to '101'.

The communicating unit 1a of the wireless terminal 1 performs a plurality of periodic communication services with the base station 2. For example, the communicating unit 1a is capable of performing a plurality of SPS services with the base station 2. According to the above example, the communicating unit 1a is capable of establishing three SPS services with the base station 2 and communicating data having a different attribute in each of the three SPS services.

The communication control unit 1b controls at least one of activation and release of each of the periodic communication services of the communicating unit 1a according to the service identifying information included in a control channel transmitted from the base station 2.

The control channel is, for example, the PDCCH as mentioned above. The PDCCH includes a 3-bit field for managing a HARQ process number. Assume here that the three SPS services SPS1 to SPS3 are established between the wireless terminal 1 and the base station 2 in the above example. In this situation, if, for example, the HARQ process number field of the PDCCH received from the base station 2 has been set to '001', the communication control unit 1b activates SPS1. If, for example, the HARQ process number field of the received PDCCH has been set to '110', the communication control unit 1b activates SPS2 and SPS3. If, for example, the HARQ process number of the received PDCCH has been set to '101', the communication control unit 1b activates SPS1 and SPS3.

Thus, the communication control unit 2b of the base station 2 is configured to include, in a control channel, service identifying information for distinguishing a plurality of periodic communication services of the communicating unit 2a to thereby allow the wireless terminal 1 to control at least one of activation and release of the individual periodic communication services. The communication control unit 1b of the wireless terminal 1 is configured to control at least one of activation and release of the individual periodic communication services of the communicating unit 1a according to the service identifying information included in the control channel transmitted from the base station 2. In this manner, the wireless terminal 1 and the base station 2 are able to control the plurality of periodic communication services.

(b) Second Embodiment

A second embodiment is described next in detail with reference to the accompanying drawings. FIG. 2 illustrates a wireless communication system according to the second embodiment. As illustrated in FIG. 2, the wireless communication system includes a wireless terminal 10 and a base station 20. The wireless terminal 10 is, for example, a mobile phone. The wireless terminal 10 and the base station 20 wirelessly communicate with each other, for example, using the LTE.

The wireless terminal 10 and the base station 20 perform a plurality of periodic communication services. For example, the wireless terminal 10 and the base station 20 establish a plurality of SPS services, and transmit and receive data having a different attribute to and from each other in each of the SPS services. For example, the base station 20 transmits, to the wireless terminal 10, image data in SPS1 and audio data in SPS2. SPS services will be explained next before the descriptions of the wireless terminal 10 and the base station 20 are given.

Figure 3:
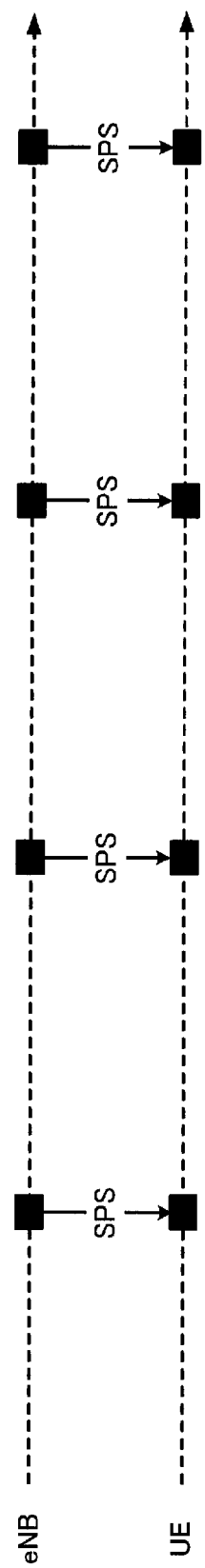
FIG. 3 illustrates operation of SPS transmissions.

FIG. 3 illustrates operation of SPS transmissions. FIG. 3 depicts the operation of downlink SPS transmissions. The dotted line arrows in FIG. 3 represent a time passage and each black square represents timing of data transmission from an evolved NodeB (eNB) to user equipment (UE). SPS is used for real-time communication such as VoIP. As illustrated in FIG. 3, in SPS, data is transmitted periodically, for example every 20 ms, from the eNB to the UE.

Figure 4:
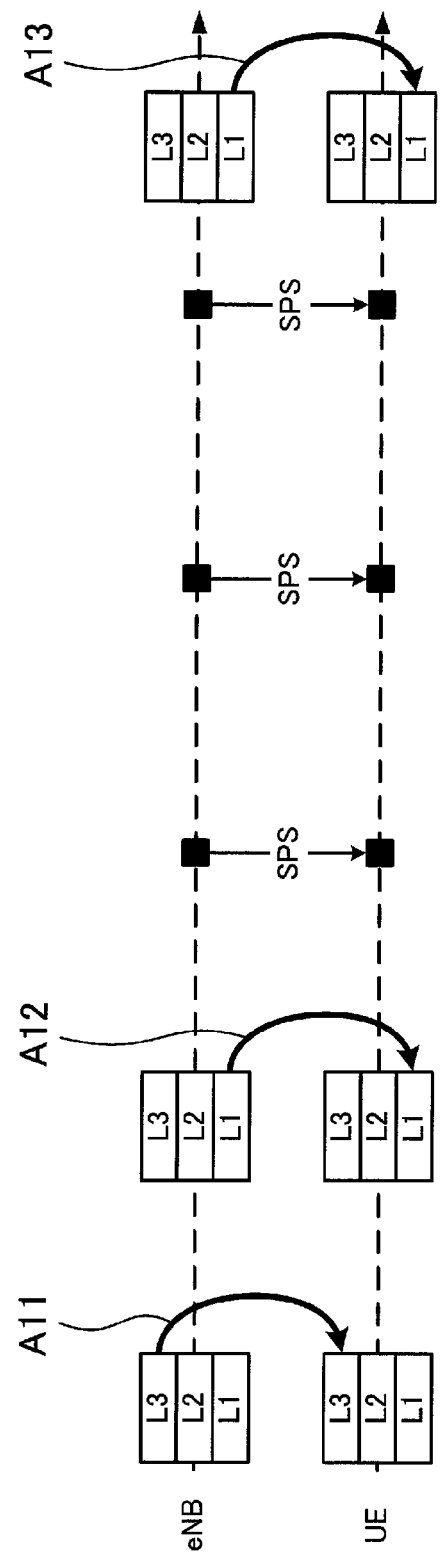
FIG. 4 illustrates activation and release of an SPS service.

FIG. 4 illustrates activation and release of an SPS service. 'L1' to 'L3' in FIG. 4 represent layers between the eNB and the UE. 'L1' is the physical layer designed to perform a range of processes, such as multiplexing of signals, channel coding, and modulation. 'L2' is the Medium Access Control (MAC) layer which provides data transmission services, such as transport channels and logical channels. 'L3' is the Radio Link Control (RLC) layer designed to provide, for example, an RRC connection process.

In order to perform an SPS service, the eNB informs in advance the UE of communication periodicity in an RRC connection at L3, as indicated by an arrow A11. Then, at the start of the actual SPS service, the eNB transmits an activation command to the UE through the PDCCH at L1, as indicated by an arrow A12. The PDCCH carrying the activation command includes information on radio resources to be used for the SPS service. The radio resource information included in the PDCCH is, for example, a data coding rate, a modulation scheme, and resource blocks (RB) to be used.

Along with the activation command, the eNB transmits data in the first SPS period. The UE receives the data in the first SPS period together with the activation command. Then, the eNB and the UE perform SPS data communication at the communication periodicity given in advance, as indicated by the black squares in FIG. 4. The eNB does not transmit downlink assignments on the PDCCH in the communication after the transmission of the activation command, thus reducing the signaling overhead of the PDCCH.

In order to stop or end an SPS service, the eNB transmits a release command to the UE through the PDCCH at L1, as indicated by an arrow A13. Alternatively, the UE is able to attempt empty transmission as multiple times as indicated by a parameter called 'implicit Release After'. With this, the SPS service is implicitly released when the number of empty transmissions reaches the value.

In order to resume an SPS service, the eNB transmits an activation command again to the UE to assign radio resources to be used. With this, the eNB and the UE resume the SPS service at communication periodicity previously given by the eNB.

Note that the above description is directed to downlink SPS activation and release, however, activation and release of an uplink SPS service is implemented in the same manner. For example, to establish an uplink SPS service, the eNB informs in advance the UE of SPS communication periodicity. At the start of the uplink SPS service, the eNB transmits an activation command to the UE. Then, the eNB and the UE perform SPS data communication at the communication periodicity given in advance. The eNB does not transmit uplink grants on the PDCCH in the communication after the transmission of the activation command, thus reducing the signaling overhead of the PDCCH.

Figure 5:
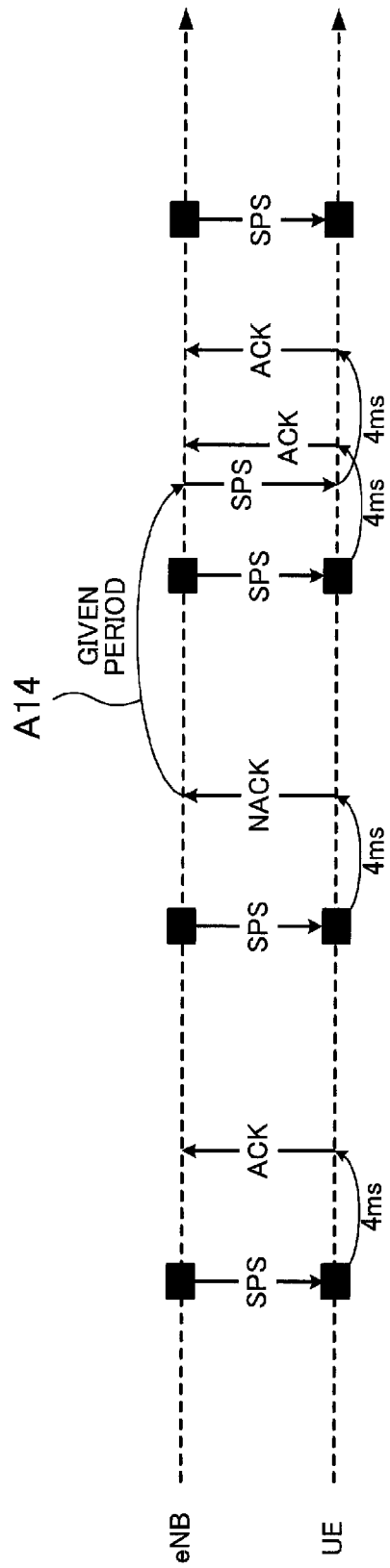
FIG. 5 illustrates HARQ operation for a downlink SPS service.

FIG. 5 illustrates HARQ operation for a downlink SPS service. As illustrated in FIG. 5, in the downlink SPS service, when receiving data from the eNB, the UE returns an ACK or NACK indicating a data reception result to the eNB in 4 ms. When receiving a NACK from the UE, the eNB retransmits data corresponding to the NACK in a given period of time, as indicated by an arrow 14 of FIG. 5. When retransmitting the data, the eNB is able to assign radio resources for the data to be retransmitted on the PDCCH.

Figure 6:
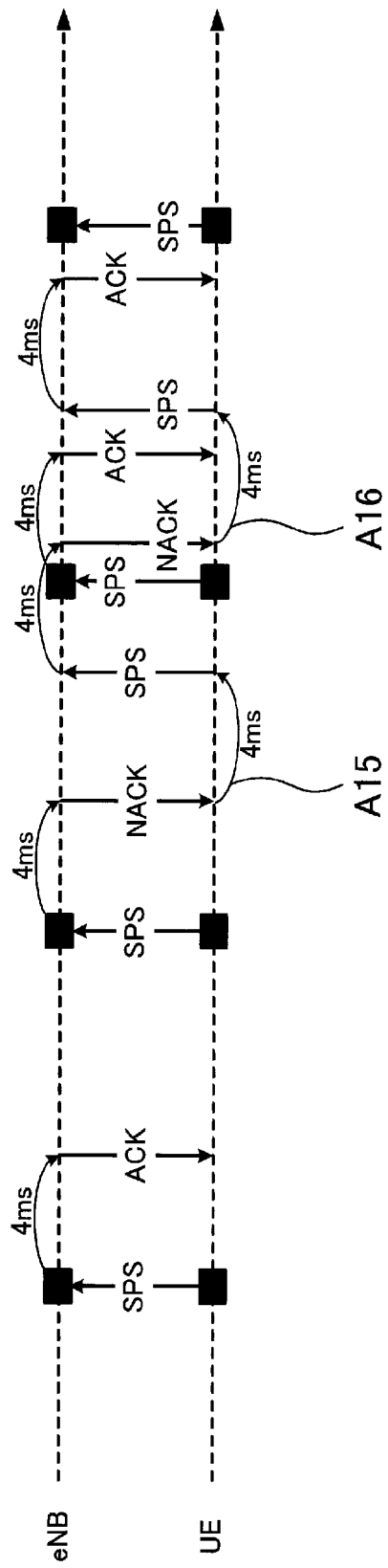
FIG. 6 illustrates HARQ operation for an uplink SPS service.

FIG. 6 illustrates HARQ operation for an uplink SPS service. As illustrated in FIG. 6, in the uplink SPS service, when receiving data from the UE, the eNB returns an ACK or NACK indicating a data reception result to the UE in 4 ms. When receiving a NACK from the eNB, the UE retransmits data corresponding to the NACK in 4 ms, as indicated by arrows A15 and A16 of FIG. 6.

FIG. 7 illustrates formats for downlink SPS resource activation and release. The PDCCH carries Downlink Control Information (DCI) which has different formats for information sent to define resource allocations. As illustrated in FIG. 7, DCI format 1/1A is used for activation of an SPS service when Multi-Input Multi-Output (MIMO) is not applied. DCI format 2/2A/2B/2C is used for activation of an SPS service when MIMO is applied. DCI format 1A is used for release of an SPS service for both the cases where MIMO is applied and not applied.

For example, as for downlink SPS activation in the case where the eNB and the UE communicate without using MIMO, the eNB uses PDCCH DCI format 1/1A. In this case, the eNB sets individual fields on the PDCCH as indicated in the column of 'DCI format 1/1A' of FIG. 7. That is, for example, a field of New Data Indicator (NDI) is set to '0'. In the case of Frequency Division Duplex (FDD) operation, a 3-bit field of the HARQ process number is set to '000'. In the case of Time Division Duplex (TDD) operation, a 4-bit field of the HARQ process number is set to '0000'. As for a 5-bit field of modulation and coding scheme, the most significant bit (MSB) is set to '0', and the lower 4 bits are set to indicate a modulation scheme and a coding rate for the downlink SPS service. In addition, a field of redundancy version is set to '00', and resource blocks to be used for the downlink SPS service are set in a field of resource block assignment.

A PDCCH may be transmitted specifically to a particular UE. When transmitting a UE-specific PDCCH, the eNB masks cyclic redundancy checking (CRC) of the PDCCH with an identifier called an SPS cell radio network temporary identifier (SPS-CRNTI). SPS-CRNTIs are identifiers assigned by the eNB to individual UEs located in the cell of the eNB to uniquely identify the UEs. Upon receiving the PDCCH, the UE uses the SPS-CRNTI given by the eNB to de-mask the CRC. Then, the UE decodes the received PDCCH to determine a DCI format of the PDCCH. In the case where the decoded format is DCI format 1/1A and the fields on the PDCCH are set as indicated in the column of 'DCI format 1/1A' of FIG. 7, the UE activates a corresponding SPS service.

That is, in order to cause an SPS service to be activated, the eNB sets the fields in PDCCH DCI format 1/1A as indicated in the column of 'DCI format 1/1A' of FIG. 7. When a PDCCH DCI format received from the eNB is DCI format 1/1A and the fields on the PDCCH are set as indicated in the column of 'DCI format 1/1A' of FIG. 7, the UE activates a corresponding SPS service.

Next described is a case where the eNB and the UE communicate with each other using MIMO. As for downlink SPS activation in the case where MIMO is applied, the eNB uses PDCCH DCI format 2/2A/2B/2C. In this case, the eNB sets individual fields on the PDCCH as indicated in the column of 'DCI format 2/2A/2B/2C' of FIG. 7. As in the above case where MIMO is not applied, the UE de-masks a CRC of the received PDCCH using an SPS-CRNTI and decodes the received PDCCH to determine a DCI format of the PDCCH. In the case where the decoded format is DCI format 2/2A/2B/2C and the fields on the PDCCH are set as indicated in the column of 'DCI format 2/2A/2B/2C' of FIG. 7, the UE activates a corresponding SPS service.

Next described is downlink SPS release. As for downlink SPS release, the eNB uses PDCCH DCI format 1A regardless of MIMO being applied or not. In this case, the eNB sets individual fields on the PDCCH as indicated in the column of 'DCI format 1A' of FIG. 7. The UE de-masks a CRC of the received PDCCH using an SPS-CRNTI and decodes the received PDCCH to determine a DCI format of the PDCCH. In the case where the decoded format is DCI format 1A and the fields on the PDCCH are set as indicated in the column of 'DCI format 1A' of FIG. 7, the UE releases a corresponding SPS service.

FIG. 8 illustrates formats for uplink SPS activation and release. As illustrated in FIG. 8, in order to activate an uplink SPS service, PDCCH DCI format 0 is used regardless of MIMO being applied or not. In addition, in order to release an uplink SPS service, PDCCH DCI format 0 is used regardless of MIMO being applied or not.

For example, for activation of an uplink SPS service, the eNB uses PDCCH DCI format 0. In this case, the eNB sets individual fields on the PDCCH as indicated in the column of 'DCI format 0' on the left side of FIG. 8. That is, for example, the NDI field is set to '0', a field of transmission power control (TPC) command for scheduled Physical Uplink Shared Channel (PUSCH) is set to '00', and a field of cyclic shift demodulation reference signal (DM RS) is set to '000'. As for a field of modulation and coding scheme and redundancy version, the MSB is set to '0', and the lower 4 bits are set to indicate a modulation scheme and a coding rate for the uplink SPS service. In addition, resource blocks to be used for the uplink SPS service are set in a field of resource block assignment and hopping resource allocation.

The UE de-masks a CRC of the received PDCCH using an SPS-CRNTI and decodes the received PDCCH to determine a DCI format of the PDCCH. In the case where the decoded format is DCI format 0 and the fields on the PDCCH are set as indicated in the column of 'DCI format 0' on the left side of FIG. 8, the UE activates a corresponding SPS service.

For release of an uplink SPS service, the eNB also uses PDCCH DCI format 0. In this case, the eNB sets individual fields on the PDCCH as indicated in the column of 'DCI format 0' on the right side of FIG. 8.

The UE de-masks a CRC of the received PDCCH using an SPS-CRNTI and decodes the received PDCCH to determine a DCI format of the PDCCH. In the case where the decoded format is DCI format 0 and the fields on the PDCCH are set as indicated in the column of 'DCI format 0' on the right side of FIG. 8, the UE releases a corresponding SPS service.

The wireless terminal 10 and the base station 20 are described next. The wireless terminal 10 and the base station 20 establish, for example, a plurality of SPS services to perform a plurality of periodic communication services, as described in FIG. 2.

Figure 9:
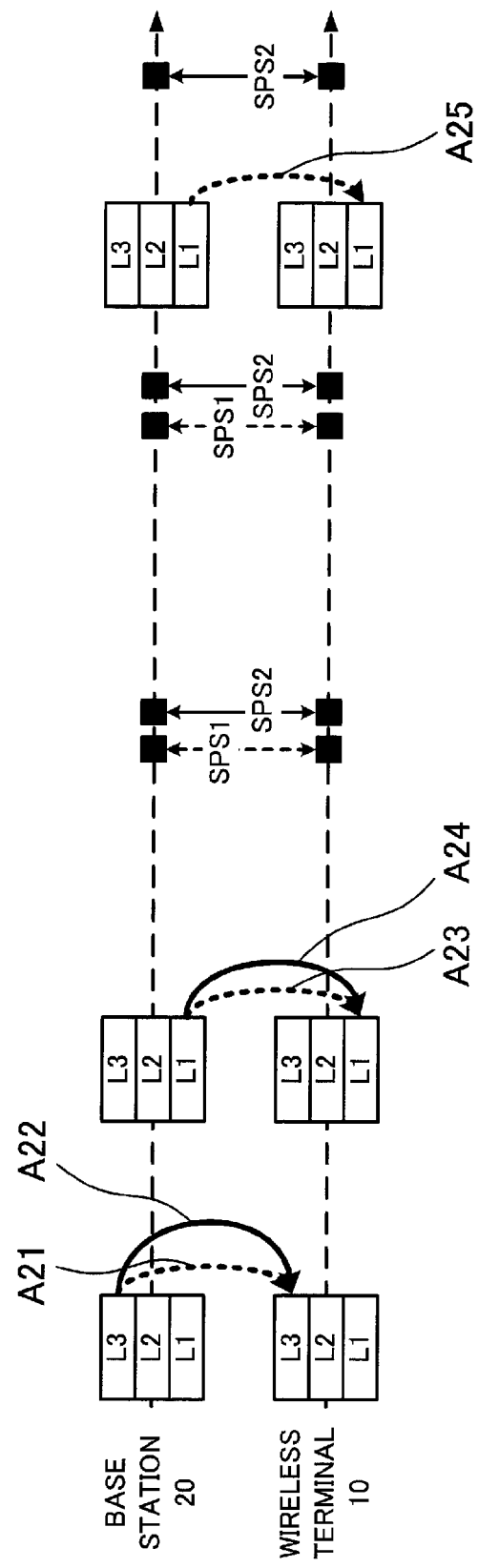
FIG. 9 illustrates operation of downlink SPS services.

FIG. 9 illustrates operation of downlink SPS services. Assume in FIG. 9 that the base station 20 performs two downlink SPS services, SPS1 and SPS2. In order to perform the two SPS services SPS1 and SPS2, the base station 20 first informs the wireless terminal 10 of communication periodicities of SPS1 and SPS2 when an RRC connection is established at L3, as indicated by arrows A21 and A22. The base station 20 is capable of using different communication periodicities for SPS1 and SPS2, however, the base station 20 uses the same periodicity according to the example of FIG. 9.

In order to start SPS1 and SPS2, the base station 20 transmits activation commands to the wireless terminal 10 through the PDCCH at L1, as indicated by arrows A23 and A24. In the case where MIMO is not applied, the base station 20 uses the HARQ process number field in PDCCH DCI format 1/1A to distinguish SPS1 from SPS2, and causes SPS1 and SPS2 to be activated separately. A more detailed description is provided later. On the other hand, in the case where MIMO is applied, the base station 20 uses the HARQ process number field in PDCCH DCI format 2/2A/2B/2C to distinguish SPS1 from SPS2, and causes SPS1 and SPS2 to be activated separately. That is, the base station 20 is able to cause only SPS1, or only SPS2, to be activated.

In order to stop or end SPS1, the base station 20 transmits a release command to the wireless terminal 10 through the PDCCH at L1, as indicated by an arrow A25. The base station 20 uses the HARQ process number field in PDCCH DCI format 1A, regardless of MIMO being applied or not, to distinguish SPS1 from SPS2, and causes SPS1 and SPS2 to be released separately. For example, the base station 20 is able to cause only SPS1, or only SPS2, to be released. A more detailed description is provided later.

The base station 20 is also capable of causing SPS2 to be resumed after SPS2 is once released. As described above, the base station 20 is able to cause SPS1 and SPS2 to be activated separately. Therefore, the base station 20 is able to, for example, cause SPS2 having been once released to be reactivated separately to thereby resume SPS2.

The use of a plurality of SPS services as described above may be applied, for example, to video communication. For example, the base station 20 transmits image data and audio data to the wireless terminal 10 using SPS1 and SPS2, respectively. In general, if channel quality degrades during video communication, image data is thinned out while audio data continues to be transmitted. Therefore, if wireless channel quality degrades, for example, the base station 20 causes SPS1 transmitting image data to be released while allowing SPS2 to continue transmitting audio data. Then, when the wireless channel quality becomes better again, the base station 20 causes SPS1 to be reactivated.

The base station 20 is also capable of causing a plurality of uplink SPS services to be activated and released, as in the case of downlink SPS services described above. For example, the base station 20 performs two uplink SPS services, SPS1 and SPS2. In order to perform the two SPS services SPS1 and SPS2, the base station 20 first informs the wireless terminal 10 of communication periodicities of SPS1 and SPS2 when an RRC connection is established at L3. The base station 20 is capable of using different communication periodicities for SPS1 and SPS2.

In order to start uplink SPS1 and SPS2 transmission, the base station 20 transmits activation commands to the wireless terminal 10 through the PDCCH at L1. Regardless of MIMO being applied or not applied, the base station 20 uses the cyclic shift DM RS field in PDCCH DCI format 0 to distinguish SPS1 from SPS2, and causes SPS1 and SPS2 to be activated separately. For example, the base station 20 is able to cause only SPS1, or only SPS2, to be activated. A more detailed description is provided later.

In order to stop or end SPS1, the base station 20 transmits a release command to the wireless terminal 10 through the PDCCH at L1. The base station 20 uses the cyclic shift DM RS field in PDCCH DCI format 0, regardless of MIMO being applied or not, to distinguish SPS1 from SPS2, and causes SPS1 and SPS2 to be released separately. For example, the base station 20 is able to cause only SPS1, or only SPS2, to be released. A more detailed description is provided later.

FIG. 10 illustrates formats for downlink SPS activation and release. FIG. 10 differs from FIG. 7 in including an SPS Index field in place of the HARQ process number field. As illustrated in FIG. 10, the base station 20 uses (redefines) the HARQ process number field as the SPS Index field to thereby specify a plurality of downlink SPS services. For example, the base station 20 uses the 3-bit field of the HARQ process number as a bitmap to distinguish three SPS services. The base station 20 causes activation and release of the individual SPS services using the SPS Index.

Assuming here that MIMO is not applied to the communication between the wireless terminal 10 and the base station 20, the base station 20 informs the wireless terminal 10 of, for example, communication periodicities of the three SPS services, SPS1 to SPS3, when an RRC connection is established. In this case, the base station 20 then transmits an activation command to the wireless terminal 10 with PDCCH DCI format 1/1A. Here, the individual fields in PDCCH DCI format 1/1A are set by the base station 20 as indicated in the column of 'DCI format 1/1A' of FIG. 10.

With the activation command, the base station 20 specifies one or more SPS services to be activated using the 3-bit bitmap of the SPS Index. For example, each bit of the 3-bit bitmap corresponds to one of SPS1 to SPS3, and the SPS Index is denoted as (b2, b1, b0) where 'b0' corresponds to SPS1, 'b1' corresponds to SPS2, and 'b2' corresponds to SPS3. In order to cause SPS1 to be activated, for example, the base station 20 sets '001' in the SPS Index field. Similarly, to cause SPS2 and SPS3 to be activated, the base station 20 sets '110' in the SPS Index field. In this manner, the base station 20 is able to cause only SPS1, or only SPS2 and SPS3, to be activated.

Also in the case where MIMO is applied, the base station 20 is able to specify one or more of SPS1 to SPS3 to be activated, as described above, using the SPS Index of PDCCH DCI format 2/2A/2B/2C. In addition, the base station 20 is able to specify one or more of SPS1 to SPS3 to be released using the SPS Index of DCI format 1A.

Note that the 4-bits field of the HARQ process number may be used as the SPS Index. However, in the case of FDD operation, only three bits are assigned to the HARQ process number, and it is therefore not possible to specify an SPS service using the forth bit. For this reason, it is preferable to use the 3-bit field of the HARQ process number as the SPS Index. That is, the SPS Index represented by the 3-bit field of the HARQ process number enables its use in both FDD and TDD operation.

FIG. 11 illustrates formats for uplink SPS activation and release. FIG. 11 differs from FIG. 8 in including the SPS Index field in place of the cyclic shift DM RS field. As illustrated in FIG. 11, the base station 20 uses the cyclic shift DM RS field as the SPS Index field to thereby specify a plurality of uplink SPS services. For example, the base station 20 uses the 3-bit field of the cyclic shift DM RS as a bitmap to distinguish three SPS services. The base station 20 causes activation and release of the individual SPS services using the SPS Index.

Assume, for example, that the base station 20 informs the wireless terminal 10 of communication periodicities of the three SPS services, SPS1 to SPS3, when an RRC connection is established. In this case, regardless of MIMO being applied or not, the base station 20 then transmits an activation command to the wireless terminal 10 with PDCCH DCI format 0. Here, the individual fields in PDCCH DCI format 0 are set by the base station 20 as indicated in the column of 'DCI format 0' on the left side of FIG. 11.

With the activation command, the base station 20 specifies one or more SPS services to be activated using the 3-bit bitmap of the SPS Index. For example, each bit of the 3-bit bitmap corresponds to one of SPS1 to SPS3, and the SPS Index is denoted as (b2, b1, b0) where 'b0' corresponds to SPS1, 'b1' corresponds to SPS2, and 'b2' corresponds to SPS3. In order to cause SPS1 to be activated, for example, the base station 20 sets '001' in the SPS Index field. Similarly, to cause SPS2 and SPS3 to be activated, the base station 20 sets '110' in the SPS Index field. In this manner, the base station 20 is able to cause only SPS1, or only SPS2 and SPS3, to be activated.

Also in the case of uplink SPS release, the base station 20 is able to specify one or more of SPS1 to SPS3 to be released, as described above, using the SPS Index of DCI format 0.

Figure 12:
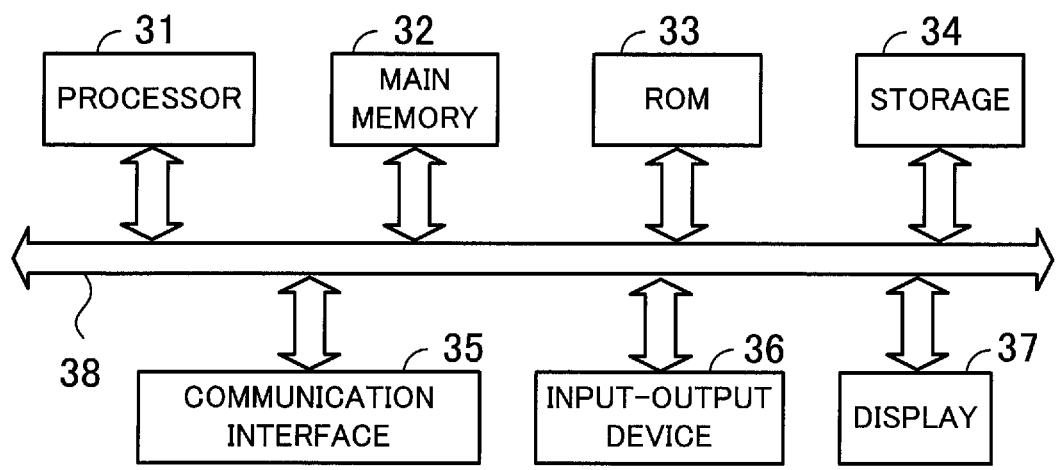
FIG. 12 illustrates a hardware configuration example of a wireless terminal.

FIG. 12 illustrates a hardware configuration example of a wireless terminal. As illustrated in FIG. 12, the wireless terminal 10 includes a processor 31, a main memory 32, a read-only memory (ROM) 33, a storage 34, a communication interface 35, an input-output device 36, a display 37, and a bus 38. The main memory 32, the ROM 33, the storage 34, the communication interface 35, the input-output device 36, and the display 37 are connected to the processor 31 via the bus 38. Overall control of the wireless terminal 10 is exercised by the processor 31. The processor 31 is, for example, a central processing unit (CPU).

The main memory 32 temporarily stores therein data and programs to be used by the processor 31 for its various processes. The ROM 33 stores therein static information such as protocols to define operation of the wireless terminal 10. For example, the ROM 33 stores information used by the processor 31 to implement data plane processing, control plane processing, scheduling processing, and the like. The storage 34 stores therein data and programs to be used by the processor 31 for its various processes. The communication interface 35 wirelessly communicates with the base station 20. For example, the communication interface 35 converts baseband signals into radio frequency signals, which are then output to an antenna (not illustrated). The communication interface 35 also frequency-converts radio signals received by an antenna (not illustrated) into baseband signals.

The input-output device 36 includes, for example, keys, speakers, and a microphone. For example, the keys allow a user to input letters and numbers into the wireless terminal 10. In addition, the speakers convert audio signals received from the base station 20 into sound to output. The microphone converts voice of the user into electrical signals. The display 37 is, for example, a liquid crystal display (LCD). The display 37 displays, for example, data received from the base station 20.

Figure 13:
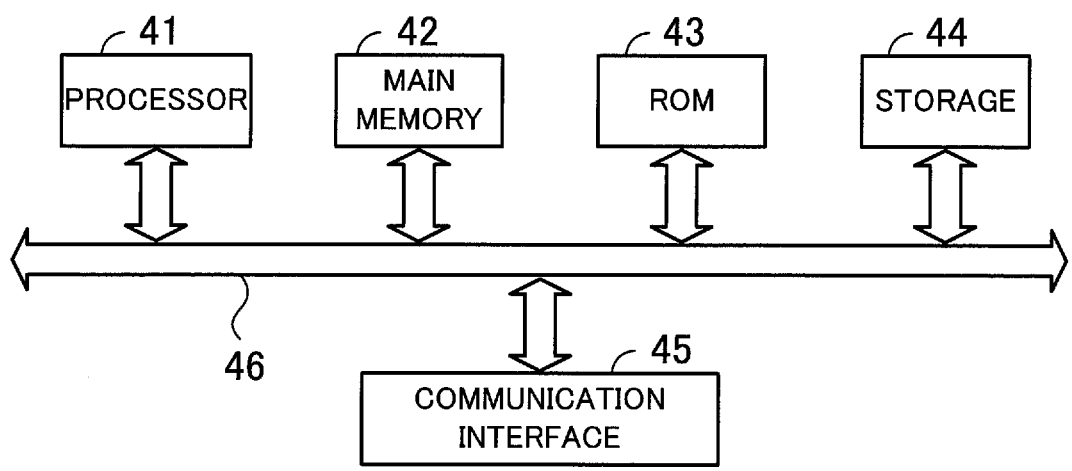
FIG. 13 illustrates a hardware configuration example of a base station.

FIG. 13 illustrates a hardware configuration example of a base station. As illustrated in FIG. 13, the base station 20 includes a processor 41, a main memory 42, a ROM 43, a storage 44, a communication interface 45, and a bus 46. The main memory 42, the ROM 43, the storage 44, and the communication interface 45 are connected to the processor 41 via the bus 46. Overall control of the base station 20 is exercised by the processor 41 which is, for example, a CPU.

The main memory 42 temporarily stores therein data and programs to be used by the processor 41 for its various processes. The ROM 43 stores therein static information such as protocols to define operation of the base station 20. For example, the ROM 43 stores information used by the processor 41 to implement data plane processing, control plane processing, scheduling processing, and the like. The storage 44 stores therein data and programs to be used by the processor 41 for its various processes. The communication interface 45 wirelessly communicates with the wireless terminal 10. For example, the communication interface 45 converts baseband signals into radio frequency signals, which are then output to an antenna (not illustrated). The communication interface 45 also frequency-converts radio signals received by an antenna (not illustrated) into baseband signals. In addition, the communication interface 45 communicates with a higher-level apparatus, such as a serving gateway (S-GW), using a wired connection.

Figure 14:
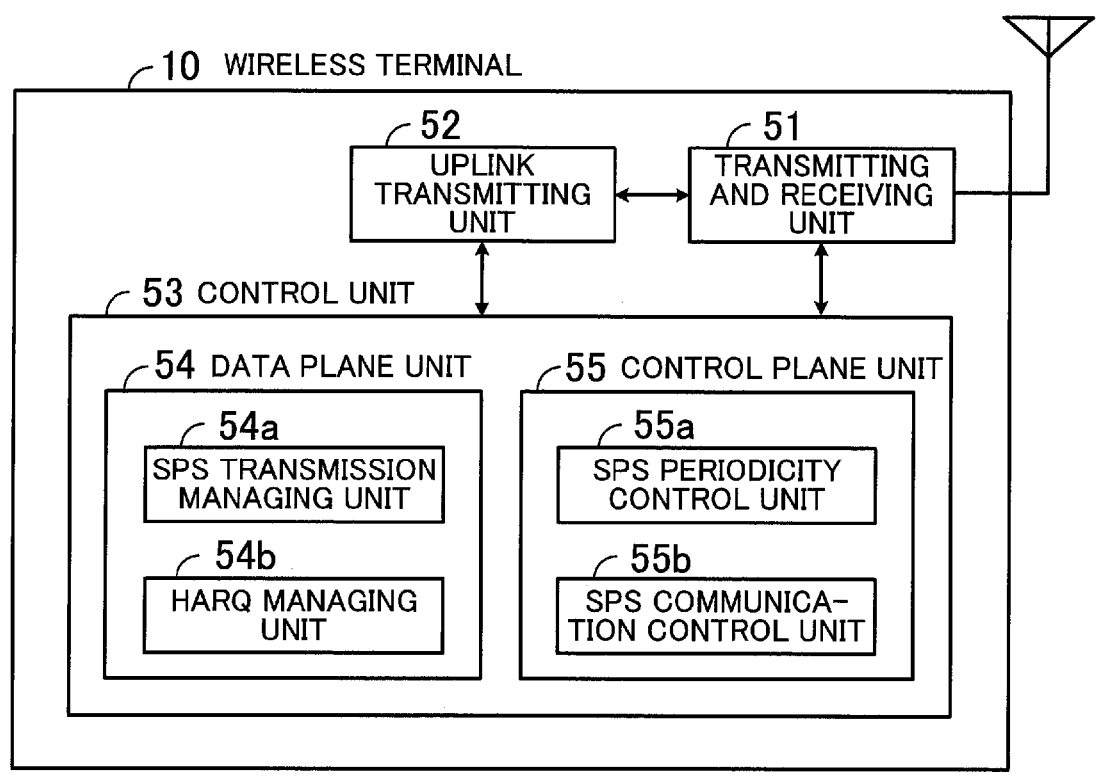
FIG. 14 is a block diagram of the wireless terminal.

FIG. 14 is a block diagram of a wireless terminal. The wireless terminal 10 includes a transmitting and receiving unit 51, an uplink transmitting unit 52, and a control unit 53. The control unit 53 includes a data plane unit 54 and a control plane unit 55. The data plane unit 54 includes an SPS transmission managing unit 54a and a HARQ managing unit 54b. The control plane unit 55 includes an SPS periodicity control unit 55a and an SPS communication control unit 55b. Functions of the transmitting and receiving unit 51 and the uplink transmitting unit 52 are implemented, for example, by the communication interface 35 of FIG. 12. Functions of the control unit 53 are implemented, for example, by the processor 31 of FIG. 12.

The transmitting and receiving unit 51 transmits and receives data wirelessly. The uplink transmitting unit 52 performs uplink data transmission processes, such as acknowledgment of transmitted data. The data plane unit 54 provides various controls on the physical layer, the MAC layer, the RLC layer, and the Packet Data Control Protocol (PDCP) layer. The SPS transmission managing unit 54a manages data transmission timing of a plurality of SPS services. The HARQ managing unit 54b is in charge of HARQ management for data. The control plane unit 55 executes processes of the RRC protocol, and also controls all the layers. The SPS periodicity control unit 55a controls periodicities of a plurality of SPS services individually. The SPS communication control unit 55b controls timing of transmitting and receiving data of the individual SPS services and their radio resources.

Figure 15:
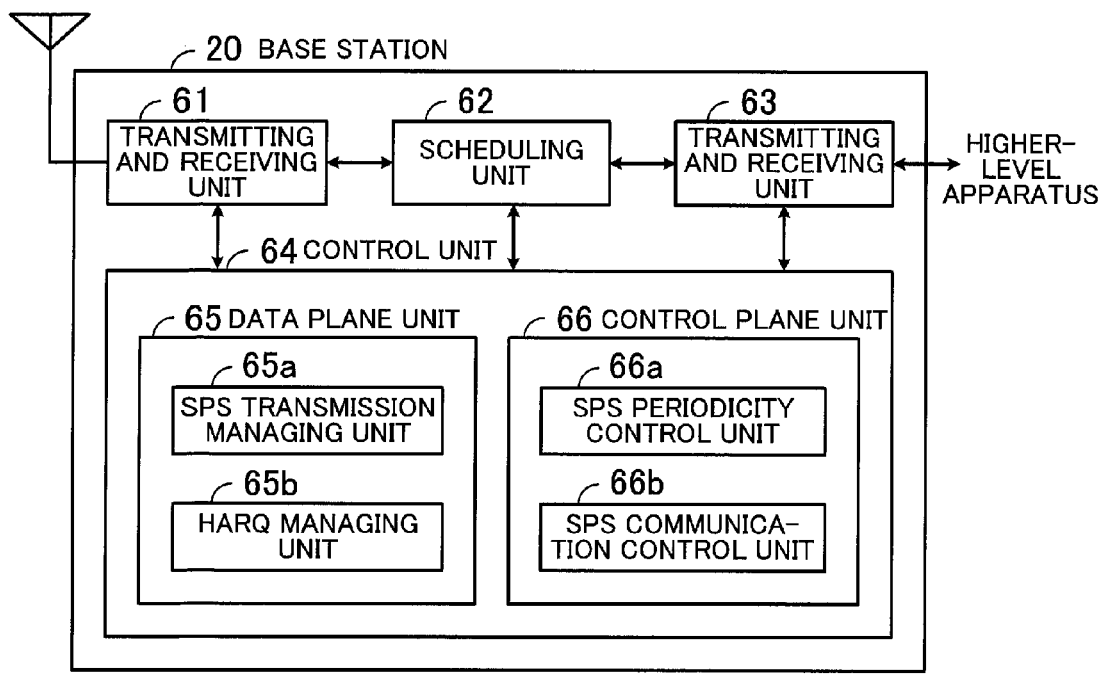
FIG. 15 is a block diagram of the base station.

FIG. 15 is a block diagram of a base station. As illustrated in FIG. 15, the base station 20 includes transmitting and receiving units 61 and 63, a scheduling unit 62, and a control unit 64. The control unit 64 includes a data plane unit 65 and a control plane unit 66. The data plane unit 65 includes an SPS transmission managing unit 65a and a HARQ managing unit 65b. The control plane unit 66 includes an SPS periodicity control unit 66a and an SPS communication control unit 66b. Functions of the transmitting and receiving units 61 and 63 are implemented, for example, by the communication interface 45 of FIG. 13. Functions of the scheduling unit 62 and the control unit 64 are implemented, for example, by the processor 41 of FIG. 13.

The transmitting and receiving unit 61 transmits and receives data wirelessly. The scheduling unit 62 allocates (schedules) radio resources for data to be transmitted wirelessly. The transmitting and receiving unit 63 transmits and receives data to and from a higher-level apparatus. The data plane unit 65 provides various controls on the physical layer, the MAC layer, the RLC layer, and the PDCP layer. The SPS transmission managing unit 65a manages data transmission timing of a plurality of SPS services. The HARQ managing unit 65b is in charge of HARQ management for data. The control plane unit 66 executes processes of the RRC protocol, and also controls all the layers. The SPS periodicity control unit 66a controls periodicities of a plurality of SPS services individually. The SPS communication control unit 66b controls timing of transmitting and receiving data of the individual SPS services and their radio resources.

Figure 16:
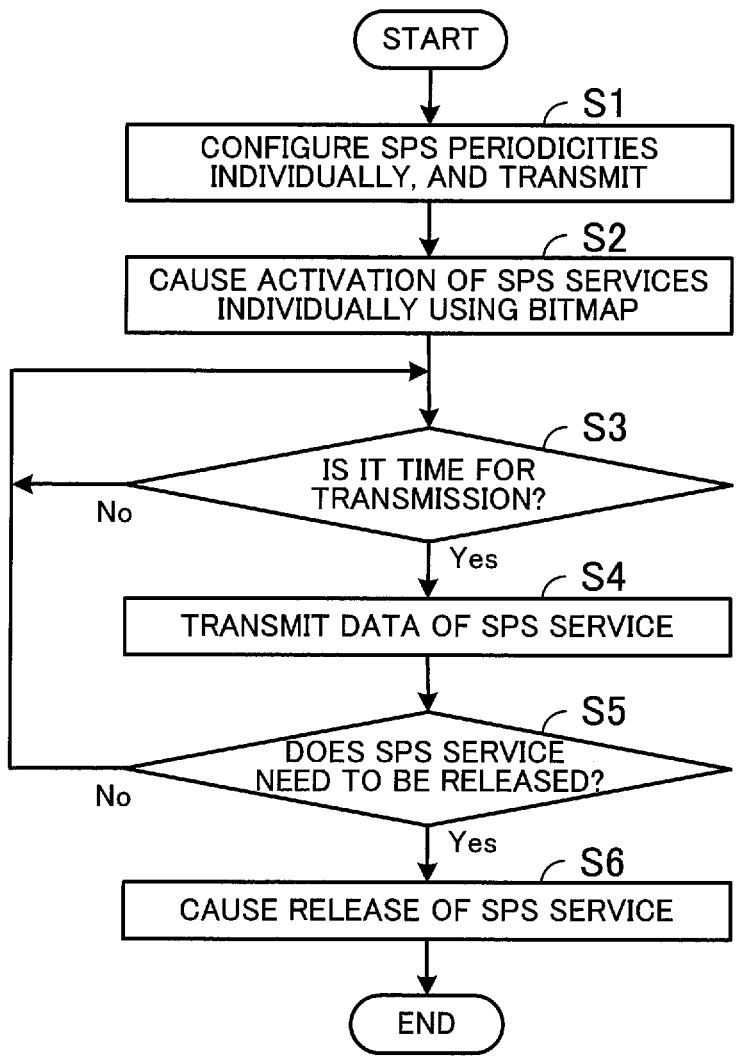
FIG. 16 is a flowchart illustrating downlink SPS operation of the base station.

FIG. 16 is a flowchart illustrating downlink SPS operation of a base station.

[Step S1] The SPS periodicity control unit 66a of the base station 20 configures communication periodicities of a plurality of SPS services individually. For example, to perform video communication, the SPS periodicity control unit 66a configures SPS periodicity of image data and SPS periodicity of audio data individually. When an RRC connection is established, the SPS communication control unit 66b transmits the periodicities of the SPS services configured by the SPS periodicity control unit 66a to the wireless terminal 10 via the transmitting and receiving unit 61.

[Step S2] The SPS communication control unit 66b causes one or more SPS services to be activated in order to start the SPS services. The SPS communication control unit 66b specifies the SPS services to be activated using the SPS Index of the PDCCH. For example, to specify the SPS services to be activated, the SPS communication control unit 66b uses the 3-bit bitmap of the SPS Index.

The transmitting and receiving unit 61 transmits, to the wireless terminal 10, the PDCCH carrying an activation command generated by the SPS communication control unit 66b. Note that, when transmitting the PDCCH with the activation command, the transmitting and receiving unit 61 also transmits data in the first SPS period to the wireless terminal 10 through the PDSCH.

[Step S3] The SPS transmission managing unit 65a determines whether it is time to transmit data of one of the activated SPS services, based on the communication periodicities configured by the SPS periodicity control unit 66a. If determining that it is time to transmit data of one of the activated SPS services, the SPS transmission managing unit 65a proceeds to step S4. On the other hand, if determining that it is not time to transmit data of one of the activated SPS services, the SPS transmission managing unit 65a repeats the determination process of step S3.

[Step S4] The transmitting and receiving unit 61 transmits data of the corresponding one of the activated SPS services to the wireless terminal 10.

[Step S5] The SPS communication control unit 66b determines whether to cause an SPS service to be released. The SPS communication control unit 66b determines an SPS service to be released, for example, based on the state of the radio channel. Specifically, if the state of the radio channel drops below a threshold value, the SPS communication control unit 66b determines release of an SPS service dealing with image data transmission to thin out image data. If determining release of an SPS service, the SPS communication control unit 66b proceeds to step S6. On the other hand, if determining not to release an SPS service, the SPS communication control unit 66b proceeds to step S3.

[Step S6] The SPS communication control unit 66b specifies the SPS service to be released using the SPS Index of the PDCCH. For example, to specify the SPS service to be released, the SPS communication control unit 66b uses the bitmap of the SPS Index. The transmitting and receiving unit 61 transmits a release command generated by the SPS communication control unit 66b to the wireless terminal 10.

Figure 17:
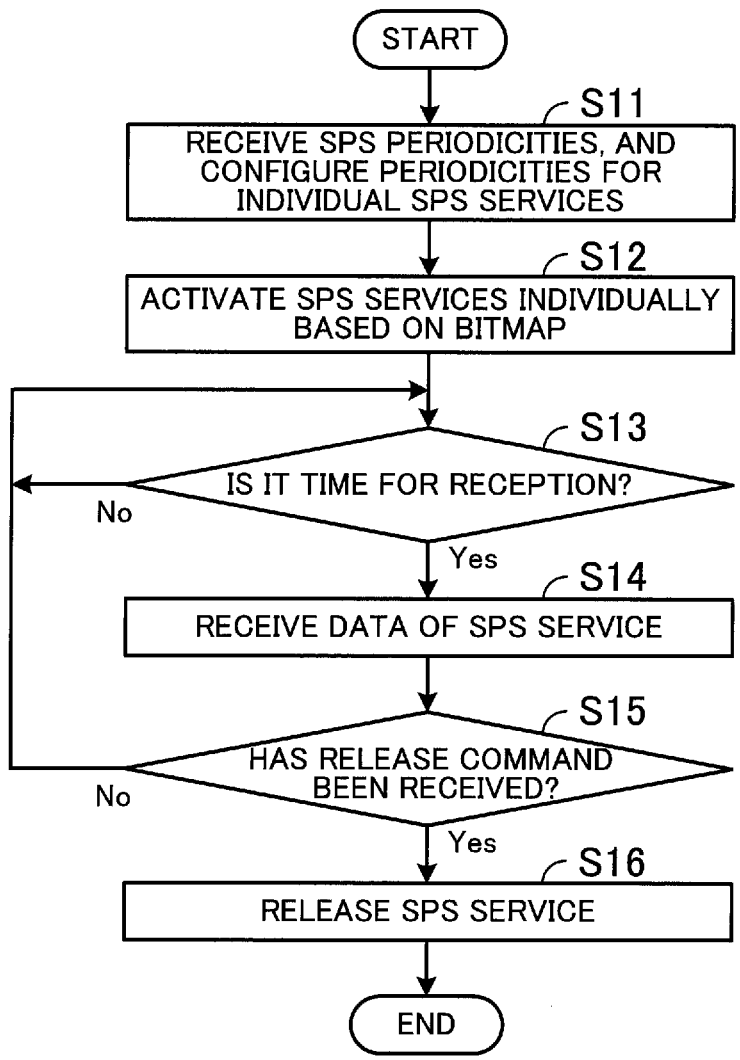
FIG. 17 is a flowchart illustrating downlink SPS operation of the wireless terminal.

FIG. 17 is a flowchart illustrating downlink SPS operation of a wireless terminal.

[Step S11] When an RRC connection is established, the SPS communication control unit 55b of the wireless terminal 10 receives communication periodicities of SPS services from the base station 20 via the transmitting and receiving unit 51. The SPS periodicity control unit 55*a* configures the communication periodicities received by the transmitting and receiving unit 51 as SPS communication periodicities. For example, the SPS periodicity control unit 55*a* stores the received communication periodicities in a memory for managing communication periodicities of a plurality of SPS services.

[Step S12] The SPS communication control unit 55*b* receives an activation command from the base station 20 via the transmitting and receiving unit 51. Based on the received activation command, the SPS communication control unit 55*b* activates one or more SPS services individually. For example, the SPS communication control unit 55*b* determines the SPS services to be activated based on the 3-bit bitmap of the SPS Index. Note that, when receiving the PDCCH carrying the activation command, the transmitting and receiving unit 51 receives data in the first SPS period through the PDSCH.

[Step S13] The SPS transmission managing unit 54*a* determines whether it is time to receive data of one of the activated SPS services, based on the communication periodicities configured by the SPS periodicity control unit 55*a*. If determining that it is time to receive data of one of the activated SPS services, the SPS transmission managing unit 54*a* proceeds to step S14. On the other hand, if determining that it is not time to receive data of one of the activated SPS services, the SPS transmission managing unit 54*a* repeats the determination process of step S13.

[Step S14] The transmitting and receiving unit 51 receives data of the corresponding one of the activated SPS services transmitted from the base station 20.

[Step S15] The SPS communication control unit 55*b* determines whether a release command has been received via the transmitting and receiving unit 51. If a release command has not been received via the transmitting and receiving unit 51, the SPS communication control unit 55*b* proceeds to step S13. On the other hand, if a release command has been received via the transmitting and receiving unit 51, the SPS communication control unit 55*b* proceeds to step S16.

[Step S16] The SPS communication control unit 55*b* releases an SPS service specified by the release command. The SPS service to be released is indicated by the 3-bit bitmap of the SPS Index.

Note that the above description is directed to the downlink SPS operation, however, uplink SPS operation is implemented in the same manner. Specifically, the SPS periodicity control unit 66*a* of the base station 20 configures communication periodicities of uplink SPS services. When an RRC connection is established, the SPS communication control unit 66*b* informs the wireless terminal 10, via the transmitting and receiving unit 61, of communication periodicities configured by the SPS periodicity control unit 66*a*.

The SPS communication control unit 55*b* of the wireless terminal 10 receives the communication periodicities of uplink SPS services via the transmitting and receiving unit 51. The SPS periodicity control unit 55*a* configures the received communication periodicities as SPS communication periodicities.

The SPS communication control unit 66*b* of the base station 20 specifies one or more of the uplink SPS services to be started using the SPS Index to thereby cause the uplink SPS services to be activated. The transmitting and receiving unit 61 transmits, to the wireless terminal 10, the PDCCH carrying an activation command generated by the SPS communication control unit 66*b*.

The communication control unit 55*b* of the wireless terminal 10 receives the activation command from the base station 20 via the transmitting and receiving unit 51. Based on the received activation command, the SPS communication control unit 55*b* activates one or more of the uplink SPS services individually.

The SPS transmission managing unit 54*a* transmits, to the base station 20, data of each of the activated SPS services based on the communication periodicities configured by the SPS periodicity control unit 55*a*. The transmitting and receiving unit 61 of the base station 20 receives the data of the individual SPS services transmitted from the wireless terminal 10.

In order to cause an SPS service to be released, the SPS communication control unit 66*b* of the base station 20 specifies the SPS service to be released using the SPS Index of the PDCCH. The SPS communication control unit 55*b* of the wireless terminal 10 releases the SPS service specified by a release command received via the transmitting and receiving unit 51. With this, the transmitting and receiving unit 51 stops or ends the specified SPS service.

As described above, the SPS communication control unit 66*b* of the base station 20 includes, in the PDCCH, the SPS Index for distinguishing a plurality of SPS services one from the other to thereby allow the wireless terminal 10 to control activation of the SPS services individually. Then, the communication control unit 55*b* of the wireless terminal 10 controls activation of the individual SPS services based on the SPS Index of the PDCCH transmitted from the base station 20. This enables the wireless terminal 10 and the base station 20 to control the plurality of SPS services, with reduced signaling overhead.

In addition, the SPS communication control unit 55*b* of the wireless terminal 10 and the SPS communication control unit 66*b* of the base station 20 control activation and release of individual SPS services, using the PDCCH DCI format, the field values of the PDCCH, and the SPS Index. This enables the wireless terminal 10 and the base station 20 to start and stop the plurality of SPS services, with reduced signaling overhead.

(c) Third Embodiment

A third embodiment is described next in detail with reference to the accompanying drawings. According to the second embodiment, the bitmap of the SPS Index is used to distinguish SPS services one from the other. The third embodiment distinguishes SPS services using a bit value (binary number) of the SPS Index. Note that the wireless communication system of the third embodiment is the same as the one illustrated in FIG. 2. In addition, PDCCH DCI formats are the same as those of FIGS. 10 and 11. Note however that, according to the third embodiment, each SPS service is distinguished by a bit value of the SPS Index. In addition, the hardware configuration examples of the wireless terminal and the base station of the third embodiment are the same as those in FIGS. 12 and 13, respectively. The block diagrams of the wireless terminal and the base station of the third embodiment are the same as those in FIGS. 14 and 15, respectively. Note however that the third embodiment differs from the second embodiment in how the SPS communication control units 55*b* and 66*b* distinguish SPS services. According to the third embodiment, the SPS communication control units 55*b* and 66*b* distinguish SPS services using the bit value of the SPS Index.

For example, the SPS Index is 3-bit wide as in the case of FIGS. 10 and 11. In order to specify an SPS service, the SPS communication control units 55b and 66b use the 3-bit value of the SPS Index. In this case, because the SPS Index is 3-bit wide, eight SPS services may be distinguished. For example, the SPS Index with '000' indicates SPS1, the SPS Index with '001' indicates SPS2, . . . , and the SPS Index with '111' indicates SPS8. For example, in order to cause SPS6 to be activated in the downlink, the SPS communication control unit 66b of the base station 20 sets the SPS Index of PDCCH DCI format 1/1A or PDCCH DCI format 2/2A/2B/2C to '101'. Since the SPS Index of the received PDCCH DCI format 1/1A or PDCCH DCI format 2/2A/2B/2C is '101', the communication control unit 55b of the wireless terminal 10 activates SPS6.

In order to release a downlink SPS service, the SPS communication control units 55b and 66b also use a bit value of the SPS Index to specify the SPS service to be released in the same manner. In addition, as for activation and release of an uplink SPS service, the SPS communication control units 55b and 66b use a bit value of the SPS Index to specify the SPS service in the same manner.

Note that in the case of using the bitmap of the SPS Index to distinguish SPS services, the SPS communication control units 55b and 66b control activation or release of a plurality of SPS services using one PDCCH. For example, by setting the SPS Index of the PDCCH to '011', the SPS communication control units 55b and 66b are able to activate or release both SPS1 and SPS2.

On the other hand, in the case of using the bit value of the SPS Index to distinguish SPS services, the SPS communication control units 55b and 66b transmit and receive a PDCCH for each SPS service to be activated or released. Assume for example that the SPS communication control units 55b and 66b control activation or release of SPS1 and SPS2. In this case, the SPS communication control units 55b and 66b transmit and receive a PDCCH in which the SPS Index is set to '000'. Subsequently, the SPS communication control units 55b and 66b transmit and receive a PDCCH in which the SPS Index is set to '001'. With this, SPS1 and SPS2 are activated or released.

Figure 18:
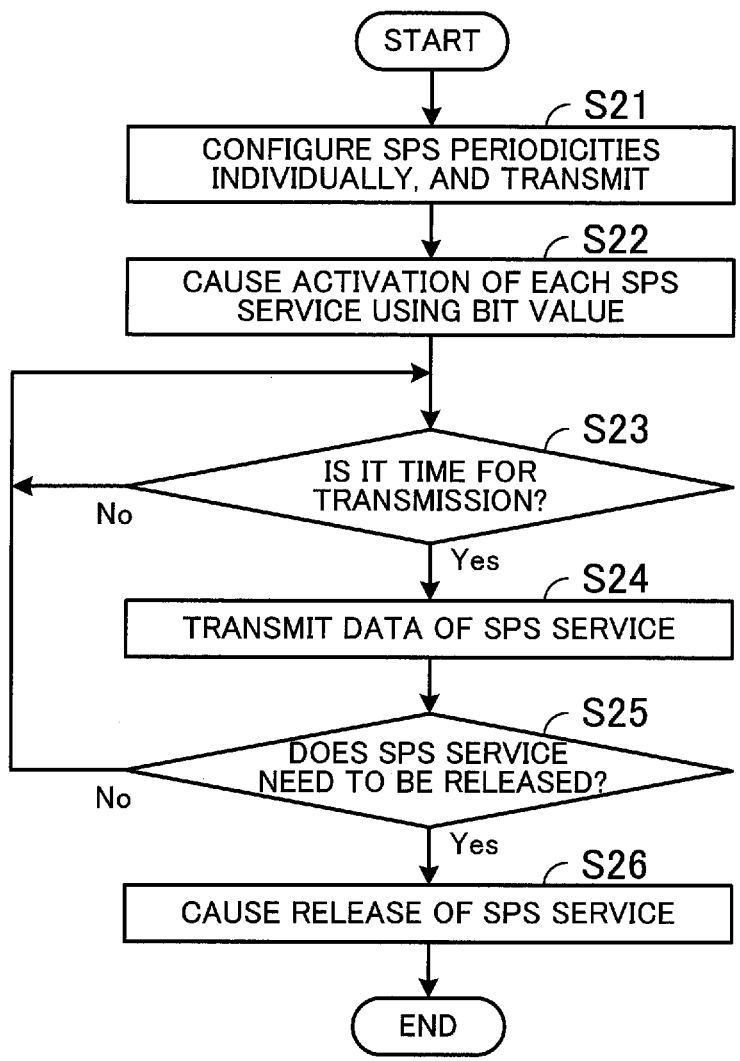
FIG. 18 is a flowchart illustrating downlink SPS operation of a base station according to a third embodiment.

FIG. 18 is a flowchart illustrating downlink SPS operation of a base station according to the third embodiment.

[Step S21] The SPS periodicity control unit 66a of the base station 20 configures communication periodicities of a plurality of SPS services individually. For example, to perform video communication, the SPS periodicity control unit 66a configures SPS periodicity of image data and SPS periodicity of audio data individually. When an RRC connection is established, the SPS communication control unit 66b transmits the periodicities of the SPS services configured by the SPS periodicity control unit 66a to the wireless terminal 10 via the transmitting and receiving unit 61.

[Step S22] The SPS communication control unit 66b causes one or more SPS services to be activated in order to start the SPS services. The SPS communication control unit 66b specifies each of the SPS services to be activated using the SPS Index of a PDCCH. For example, to specify each of the SPS services to be activated, the SPS communication control unit 66b uses the 3-bit value of the SPS Index.

The transmitting and receiving unit 61 transmits, to the wireless terminal 10, a PDCCH carrying each activation command generated by the SPS communication control unit 66b. Note that, when transmitting the PDCCH with each activation command, the transmitting and receiving unit 61 also transmits corresponding data in the first SPS period to the wireless terminal 10 through the PDSCH.

[Step S23] The SPS transmission managing unit 65a determines whether it is time to transmit data of one of the activated SPS services based on the communication periodicities configured by the SPS periodicity control unit 66a. If determining that it is time to transmit data of one of the activated SPS services, the SPS transmission managing unit 65a proceeds to step S24. On the other hand, if determining that it is not time to transmit data of one of the activated SPS services, the SPS transmission managing unit 65a repeats the determination process of step S23.

[Step S24] The transmitting and receiving unit 61 transmits data of the corresponding one of the activated SPS services to the wireless terminal 10.

[Step S25] The SPS communication control unit 66b determines whether to cause an SPS service to be released. The SPS communication control unit 66b determines an SPS service to be released, for example, based on the state of the radio channel. Specifically, if the state of the radio channel drops below a threshold value, the SPS communication control unit 66b determines release of an SPS service dealing with image data transmission to thin out image data. If determining release of an SPS service, the SPS communication control unit 66b proceeds to step S26. On the other hand, if determining not to release an SPS service, the SPS communication control unit 66b proceeds to step S23.

[Step S26] The SPS communication control unit 66b specifies the SPS service to be released using the SPS Index of the PDCCH. For example, to specify the SPS service to be released, the SPS communication control unit 66b uses the 3-bit value of the SPS Index. The transmitting and receiving unit 61 transmits a release command generated by the SPS communication control unit 66b to the wireless terminal 10.

Figure 19:
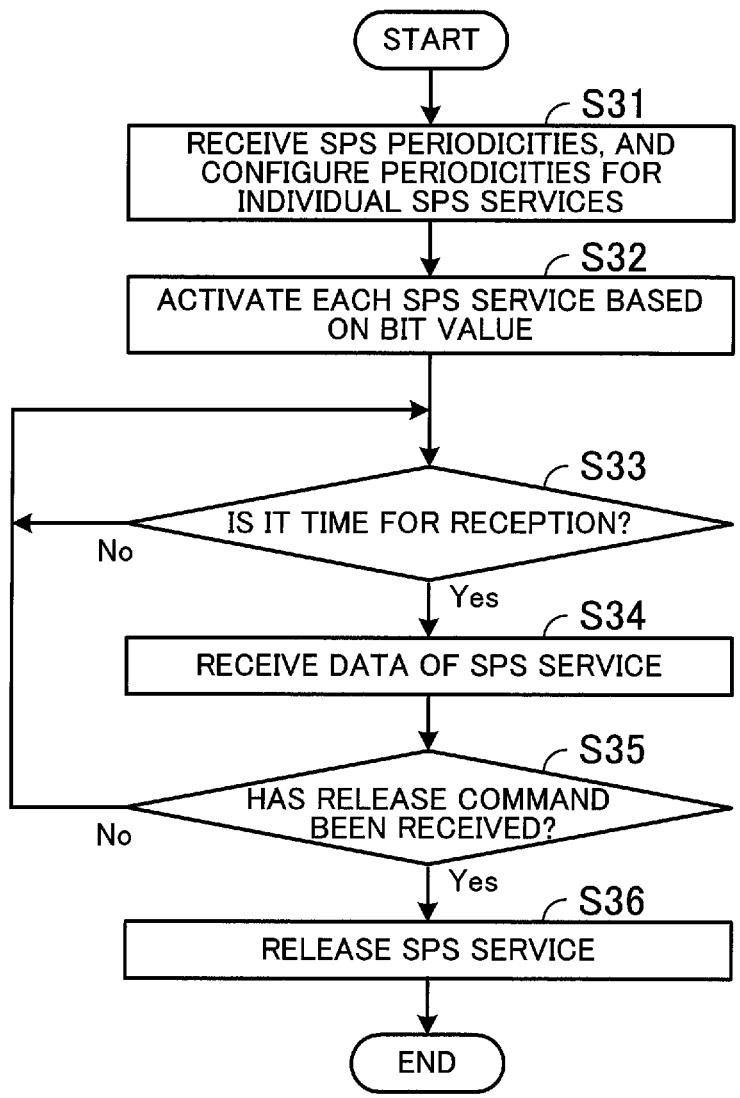
FIG. 19 is a flowchart illustrating downlink SPS operation of a wireless terminal according to the third embodiment.

FIG. 19 is a flowchart illustrating downlink SPS operation of a wireless terminal according to the third embodiment.

[Step S31] When an RRC connection is established, the SPS communication control unit 55b of the wireless terminal 10 receives communication periodicities of SPS services from the base station 20 via the transmitting and receiving unit 51. The SPS periodicity control unit 55a configures the communication periodicities received by the transmitting and receiving unit 51 as SPS communication periodicities. For example, the SPS periodicity control unit 55a stores the received communication periodicities in a memory for managing communication periodicities of a plurality of SPS services.

[Step S32] The SPS communication control unit 55b receives one or more activation commands from the base station 20 via the transmitting and receiving unit 51. Based on the received activation commands, the SPS communication control unit 55b activates corresponding SPS services individually. For example, the SPS communication control unit 55b determines an SPS service to be activated based on the 3-bit value of the SPS Index of each PDCCH. Note that, when receiving a PDCCH carrying an activation command, the transmitting and receiving unit 51 receives corresponding data in the first SPS period through the PDSCH.

[Step S33] The SPS transmission managing unit 54a determines whether it is time to receive data of one of the activated SPS services, based on the communication periodicities configured by the SPS periodicity control unit 55a. If determining that it is time to receive data of one of the activated SPS services, the SPS transmission managing unit 54a proceeds to step S34. On the other hand, if determining that it is not time to receive data of one of the activated SPS services, the SPS transmission managing unit 54a repeats the determination process of step S33.

[Step S34] The transmitting and receiving unit 51 receives data of the corresponding one of the activated SPS services transmitted from the base station 20.

[Step S35] The SPS communication control unit 55*b* determines whether a release command has been received via the transmitting and receiving unit 51. If a release command has not been received via the transmitting and receiving unit 51, the SPS communication control unit 55*b* proceeds to step S33. On the other hand, if a release command has been received via the transmitting and receiving unit 51, the SPS communication control unit 55*b* proceeds to step S36.

[Step S36] The SPS communication control unit 55*b* releases an SPS service specified by the release command. The SPS service to be released is indicated by the 3-bit bitmap of the SPS Index of a PDCCH.

Note that the above description is directed to the downlink SPS operation, however, uplink SPS operation is implemented in the same manner. Specifically, the SPS periodicity control unit 66*a* of the base station 20 configures communication periodicities of uplink SPS services. When an RRC connection is established, the SPS communication control unit 66*b* informs the wireless terminal 10, via the transmitting and receiving unit 61, of communication periodicities configured by the SPS periodicity control unit 66*a*.

The SPS communication control unit 55*b* of the wireless terminal 10 receives the communication periodicities of uplink SPS services via the transmitting and receiving unit 51. The SPS periodicity control unit 55*a* configures the received communication periodicities as SPS communication periodicities.

The SPS communication control unit 66*b* of the base station 20 specifies each of the uplink SPS services to be started using the SPS Index of a PDCCH to thereby cause the uplink SPS service to be activated. The transmitting and receiving unit 61 transmits, to the wireless terminal 10, each PDCCH carrying an activation command generated by the SPS communication control unit 66*b*.

The communication control unit 55*b* of the wireless terminal 10 receives one or more activation commands from the base station 20 via the transmitting and receiving unit 51. Based on the received activation commands, the SPS communication control unit 55*b* activates corresponding uplink SPS services individually.

The SPS transmission managing unit 54*a* transmits, to the base station 20, data of each of the activated SPS services based on the communication periodicities configured by the SPS periodicity control unit 55*a*. The transmitting and receiving unit 61 of the base station 20 receives the data of the individual SPS services transmitted from the wireless terminal 10.

In order to cause an SPS service to be released, the SPS communication control unit 66*b* of the base station 20 specifies the SPS service to be released using the bit value of the SPS Index of a PDCCH. The SPS communication control unit 55*b* of the wireless terminal 10 releases the SPS service specified by a release command received via the transmitting and receiving unit 51. With this, the transmitting and receiving unit 51 stops or ends the specified SPS service.

As described above, the SPS communication control units 55*b* and 66*b* use a bit value of the SPS Index to distinguish each SPS service, which enables control of a plurality of SPS services with reduced signaling overhead.

(d) Fourth Embodiment

A fourth embodiment is described next in detail with reference to the accompanying drawings. The fourth embodiment is directed to the case where carrier aggregation is applied to a wireless communication system. To support carrier aggregation, the PDCCH includes a field called Carrier Indicator Field (CIF). In order to provide SPS services on a primary cell (PCell) in carrier aggregation, the CIF is set to '0'. According to the fourth embodiment, the CIF with '0' is used as a field for distinguishing SPS services.

The wireless communication system according to the fourth embodiment is the same as the one illustrated in FIG. 2. Note however that carrier aggregation is applied to the wireless communication system of the fourth embodiment. In addition, the hardware configuration examples of the wireless terminal and the base station of the fourth embodiment are the same as those in FIGS. 12 and 13, respectively. The block diagrams of the wireless terminal and the base station of the fourth embodiment are the same as those in FIGS. 14 and 15, respectively. Note however that the fourth embodiment differs in how the SPS communication control units 55*b* and 66*b* distinguish SPS services. Carrier aggregation is explained first.

Figure 20:
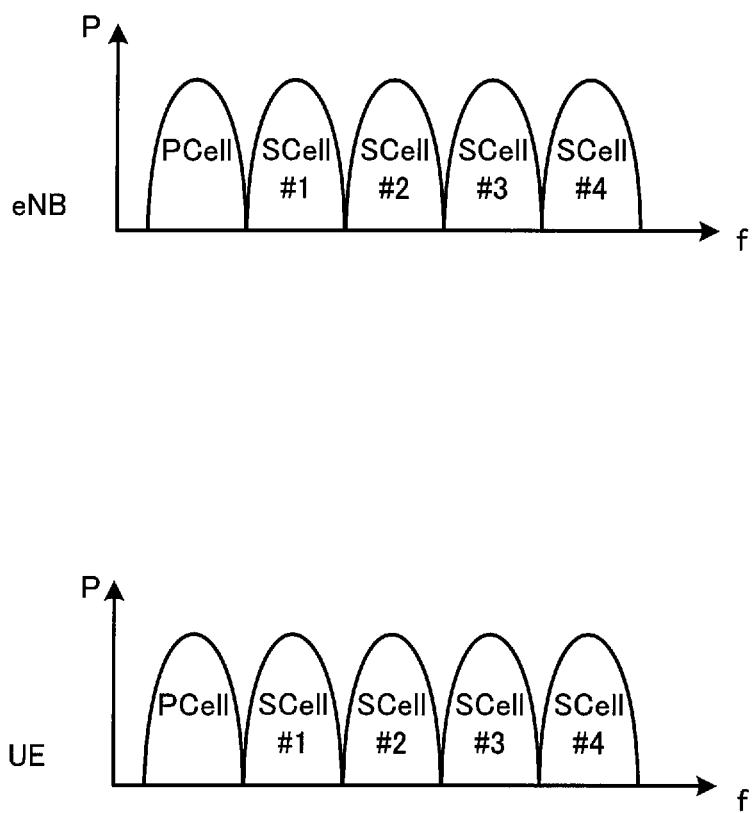
FIG. 20 illustrates carrier aggregation.

FIG. 20 is a diagram for explaining carrier aggregation. The horizontal axis and vertical axis of FIG. 20 represent frequency and power, respectively. FIG. 20 illustrates frequency bands used by the eNB and the UE.

Carrier aggregation having been examined in LTE-A enables large amount of data transmission by aggregating a plurality of frequency bands, as illustrated in FIG. 20. In carrier aggregation, a serving cell performing key control, such as transmission of control signals, is called 'primary cell (PCell)' and the remaining serving cells are called 'secondary cells (SCell)'. PCell and each SCell of FIG. 20 represent a primary cell and a secondary cell, respectively.

Figure 21:
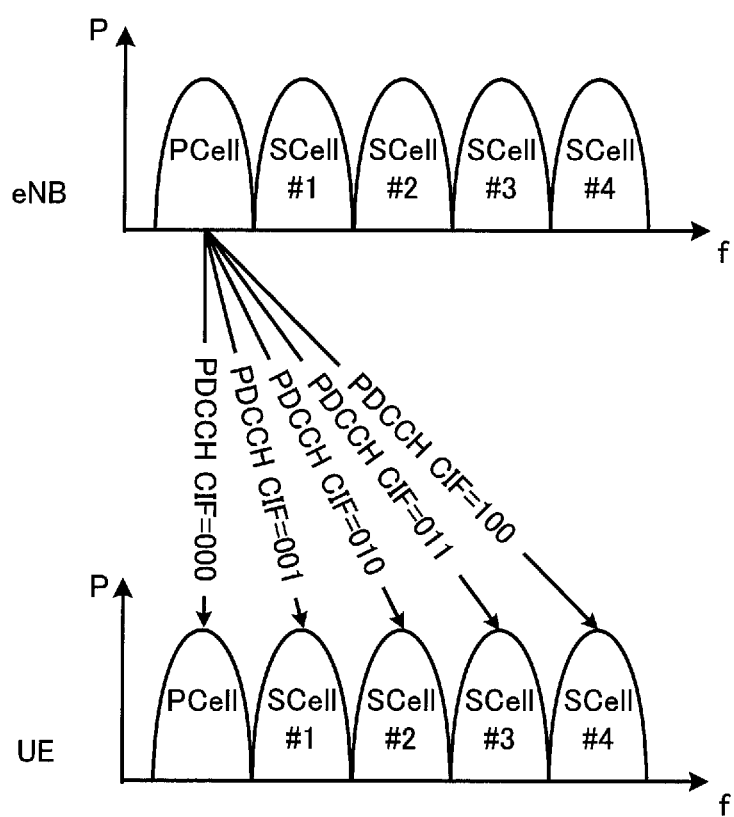
FIG. 21 illustrates cross-carrier scheduling.

FIG. 21 is a diagram for explaining cross-carrier scheduling. Cross-carrier scheduling may be adopted for carrier aggregation. With such a feature, in the case where the eNB and the UE communicate wirelessly using a plurality of carriers, radio resources for transmitting a PDCCH and radio resources for a PDSCH corresponding to the PDCCH are allocated to different carriers. For example, the eNB transmits a PDCCH to the UE on the PCell. Each PDCCH includes the CIF of 3 bits, by which the UE recognizes a SCell corresponding to the PDCCH. Assuming for example that the CIF on a PDCCH received on PCell is '001', the UE recognizes that the received PDCCH is a PDCCH of SCell1.

Next described is how to distinguish SPS services using the CIF. Since SPS services are provided on the PCell as described above, the CIF on the PDCCH for an SPS service is set to '000'. According to the fourth embodiment, the CIF on the PDCCH is used to distinguish SPS services one from the other.

FIG. 22 illustrates formats for downlink SPS activation and release according to the fourth embodiment. FIG. 22 differs from FIG. 7 in including the CIF. As illustrated in FIG. 22, the base station 20 uses the CIF to specify a plurality of downlink SPS services. For example, the base station 20 uses the 3-bit field of the CIF as a bitmap to distinguish three SPS services. The base station 20 causes activation and release of the individual SPS services using the CIF.

Assuming here that MIMO is not applied to the communication between the wireless terminal 10 and the base station 20, the base station 20 informs the wireless terminal 10 of, for example, communication periodicities of the three SPS services, SPS1 to SPS3, when an RRC connection is established. In this case, the base station 20 then transmits an activation command to the wireless terminal 10 with PDCCH DCI format 1/1A. Here, the individual fields in PDCCH DCI format 1/1A are set by the base station 20 as indicated in the column of 'DCI format 1/1A' of FIG. 22.

With the activation command, the base station 20 specifies one or more SPS services to be activated using the 3-bit bitmap of the CIF. For example, each bit of the 3-bit bitmap corresponds to one of SPS1 to SPS3, and the CIF is denoted as (b2, b1, b0) where 'b0' corresponds to SPS1, 'b1' corresponds to SPS2, and 'b2' corresponds to SPS3. In order to cause SPS1 to be activated, for example, the base station 20 sets '001' in the CIF. Similarly, to cause SPS2 and SPS3 to be activated, the base station 20 sets '110' in the CIF. In this manner, the base station 20 is able to cause only SPS1, or only SPS2 and SPS3, to be activated.

Also in the case where MIMO is applied, the base station 20 is able to specify one or more of SPS1 to SPS3 to be activated, as described above, using the CIF of PDCCH DCI format 2/2A/2B/2C. In addition, the base station 20 is able to specify one or more of SPS1 to SPS3 to be released using the CIF of DCI format 1A.

FIG. 23 illustrates formats for uplink SPS activation and release according to the forth embodiment. FIG. 23 differs from FIG. 8 in including the CIF. As illustrated in FIG. 23, the base station 20 uses the CIF to specify a plurality of uplink SPS services. For example, the base station 20 uses the 3-bit field of the CIF as a bitmap to distinguish three SPS services. The base station causes activation and release of the individual SPS services using the CIF.

Assume, for example, that the base station 20 informs the wireless terminal 10 of communication periodicities of the three SPS services, SPS1 to SPS3, when an RRC connection is established. In this case, regardless of MIMO being applied or not, the base station 20 then transmits an activation command to the wireless terminal 10 with PDCCH DCI format 0. Here, the individual fields in PDCCH DCI format 0 are set by the base station 20 as indicated in the column of 'DCI format 0' on the left side of FIG. 23.

With the activation command, the base station 20 specifies one or more SPS services to be activated using the 3-bit bitmap of the CIF. For example, each bit of the 3-bit bitmap corresponds to one of SPS1 to SPS3, and the CIF is denoted as (b2, b1, b0) where 'b0' corresponds to SPS1, 'b1' corresponds to SPS2, and 'b2' corresponds to SPS3. In order to cause SPS1 to be activated, for example, the base station 20 sets '001' in the CIF. Similarly, to cause SPS2 and SPS3 to be activated, the base station 20 sets '110' in the CIF. In this manner, the base station 20 is able to cause only SPS1, or only the SPS2 and SPS3, to be activated.

Also in the case of uplink SPS release, the base station 20 is able to specify one or more of SPS1 to SPS3 to be released, as described above, using the CIF of DCI format 0.

Figure 24:
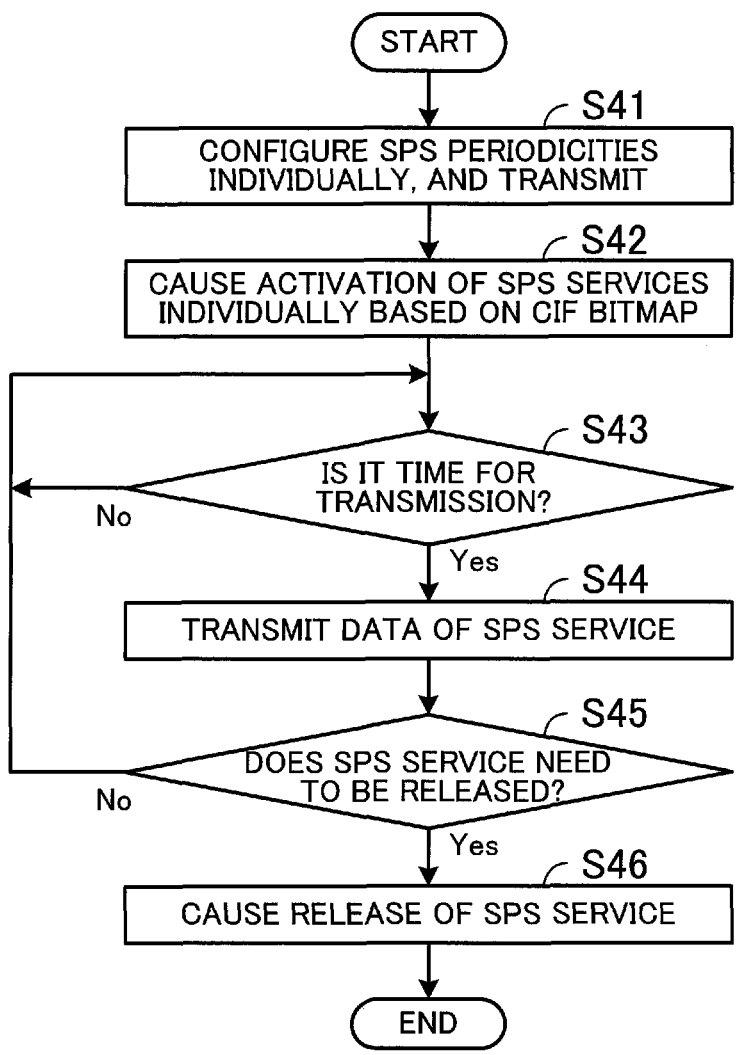
FIG. 24 is a flowchart illustrating downlink SPS operation of a base station according to a fourth embodiment.

FIG. 24 is a flowchart illustrating downlink SPS operation of a base station according to the fourth embodiment.

[Step S41] Because step S41 is the same as step S1 of FIG. 16, the description is omitted.

[Step S42] The SPS communication control unit 66*b* causes one or more SPS services to be activated in order to start the SPS services. The SPS communication control unit 66*b* specifies the SPS services to be activated using the CIF of the PDCCH. For example, to specify the SPS services to be activated, the SPS communication control unit 66*b* uses the 3-bit bitmap of the CIF.

The transmitting and receiving unit 61 transmits, to the wireless terminal 10, the PDCCH carrying an activation command generated by the SPS communication control unit 66*b*. Note that, when transmitting the PDCCH with the activation command, the transmitting and receiving unit 61 also transmits data in the first SPS period to the wireless terminal 10 through the PDSCH.

[Steps S43 to S45] Because steps S43 to S45 are the same as steps S3 to S5 of FIG. 16, the descriptions are omitted.

[Step S46] The SPS communication control unit 66*b* specifies the SPS service to be released using the CIF of the PDCCH. For example, to specify the SPS service to be released, the SPS communication control unit 66*b* uses the bitmap of the CIF. The transmitting and receiving unit transmits a release command generated by the SPS communication control unit 66*b* to the wireless terminal 10.

Figure 25:
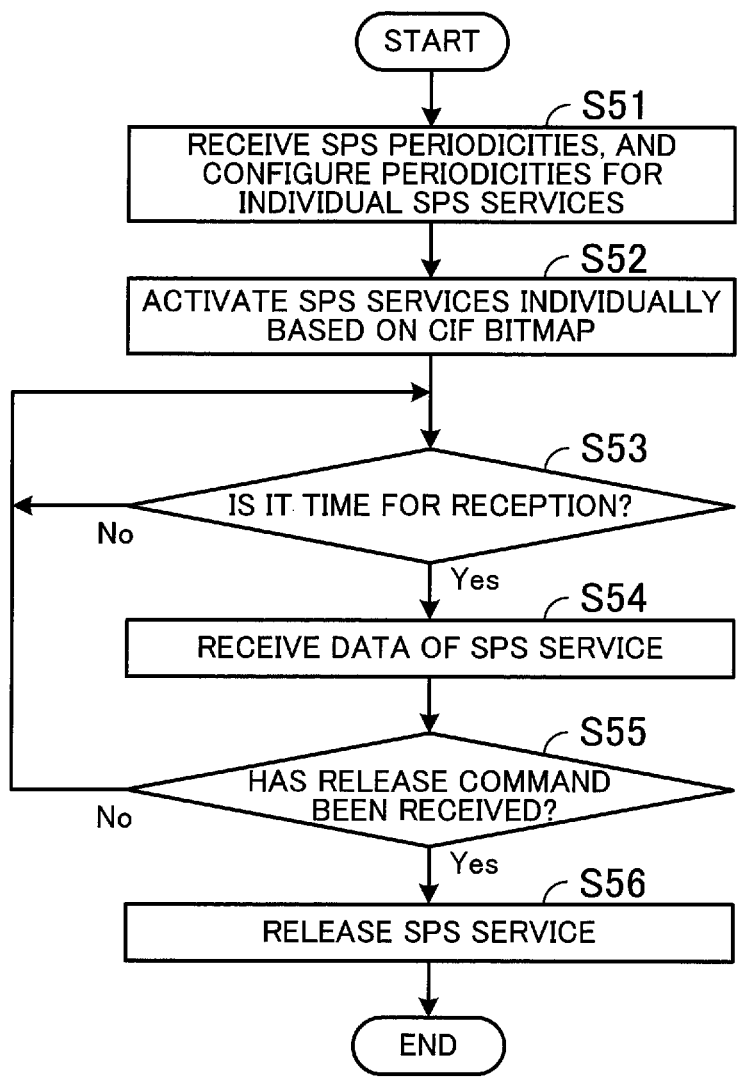
FIG. 25 is a flowchart illustrating downlink SPS operation of a wireless terminal according to the fourth embodiment.

FIG. 25 is a flowchart illustrating downlink SPS operation of a wireless terminal according to the fourth embodiment.

[Step S51] Because step S51 is the same as step S11 of FIG. 17, the description is omitted.

[Step S52] The SPS communication control unit 55*b* receives an activation command from the base station 20 via the transmitting and receiving unit 51. Based on the received activation command, the SPS communication control unit 55*b* activates one or more SPS services individually. For example, the SPS communication control unit 55*b* determines the SPS services to be activated based on the 3-bit bitmap of the CIF. Note that, when receiving the PDCCH carrying the activation command, the transmitting and receiving unit 51 receives data in the first SPS period through the PDSCH.

[Steps S53 to S55] Because steps S53 to S55 are the same as steps S13 to S15 of FIG. 17, the descriptions are omitted.

[Step S56] The SPS communication control unit 55*b* releases an SPS service specified by the release command. The SPS service to be released is indicated by the 3-bit bitmap of the CIF.

Note that the above description is directed to the downlink SPS operation, however, uplink SPS operation is implemented in the same manner. The uplink SPS operation of the fourth embodiment is the same as, for example, that of the second embodiment although differing in distinguishing individual SPS services using the CIF.

As described above, the SPS communication control units 55*b* and 66*b* use a bitmap of the CIF to distinguish a plurality of SPS services one from the other, which enables control of the SPS services with reduced signaling overhead.

(e) Fifth Embodiment

A fifth embodiment is described next in detail with reference to the accompanying drawings. According to the fourth embodiment, the bitmap of the CIF is used to distinguish SPS services one from the other. The fifth embodiment distinguishes SPS services using a bit value of the CIF. Note that the wireless communication system of the fifth embodiment is the same as the one illustrated in FIG. 2. In addition, PDCCH DCI formats are the same as those of FIGS. 22 and 23. Note however that, according to the fifth embodiment, each SPS service is distinguished by a bit value of the CIF. The hardware configuration examples of the wireless terminal and the base station of the fifth embodiment are the same as those in FIGS. 12 and 13, respectively. The block diagrams of the wireless terminal and the base station of the fifth embodiment are the same as those in FIGS. 14 and 15, respectively. Note however that the fifth embodiment differs in how the SPS communication control units 55*b* and 66*b* distinguish each SPS service, and the SPS communication control units 55*b* and 66*b* use the bit value of the CIF to distinguish each SPS service.

For example, the CIF is 3-bit wide as in the case of FIGS. 22 and 23. In order to specify an SPS service, the SPS communication control units 55b and 66b use the 3-bit value of the CIF. In this case, because the CIF is 3-bit wide, eight SPS services may be distinguished. For example, the CIF with '000' indicates SPS1, the CIF with '001' indicates SPS2, . . . , and the CIF with '111' indicates SPS8. For example, in order to cause SPS6 to be activated in the downlink, the SPS communication control unit 66b of the base station 20 sets the CIF of PDCCH DCI format 1/1A or PDCCH DCI format 2/2A/2B/2C to '101'. Since the CIF of the received PDCCH DCI format 1/1A or PDCCH DCI format 2/2A/2B/2C is '101', the communication control unit 55b of the wireless terminal 10 activates SPS6.

In order to release a downlink SPS service, the SPS communication control units 55b and 66b also use a bit value of the CIF to specify the SPS service to be released in the same manner. In addition, as for activation and release of an uplink SPS service, the SPS communication control units 55b and 66b use a bit value of the CIF to specify the SPS service in the same manner.

Note that in the case of using the bitmap of the CIF to distinguish SPS services, the SPS communication control units 55b and 66b control activation or release of a plurality of SPS services using one PDCCH. For example, by setting the CIF of the PDCCH to '011', the SPS communication control units 55b and 66b are able to activate or release both SPS1 and SPS2.

On the other hand, in the case of using the bit value of the CIF to distinguish SPS services, the SPS communication control units 55b and 66b transmit and receive a PDCCH for each SPS service to be activated or released. Assume for example that the SPS communication control units 55b and 66b control activation or release of SPS1 and SPS2. In this case, the SPS communication control units 55b and 66b transmit and receive a PDCCH in which the CIF is set to '000'. Subsequently, the SPS communication control units 55b and 66b transmit and receive a PDCCH in which the CIF is set to '001'. With this, SPS1 and SPS2 are activated or released.

Figure 26:
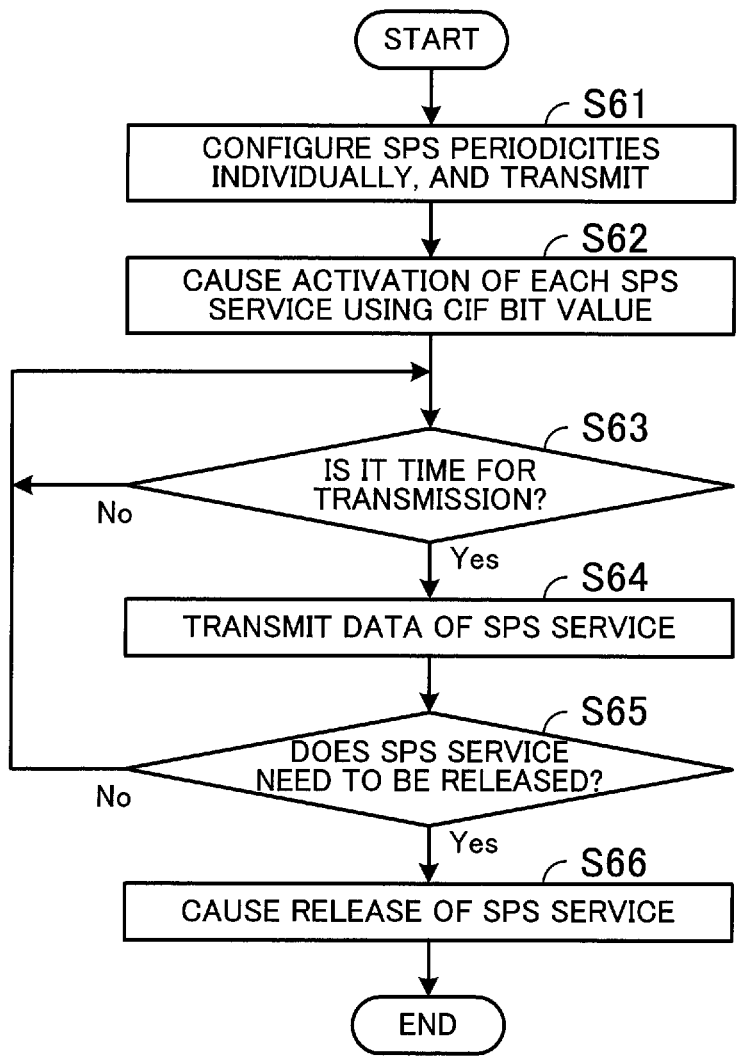
FIG. 26 is a flowchart illustrating downlink SPS operation of a base station according to a fifth embodiment.

FIG. 26 is a flowchart illustrating downlink SPS operation of a base station according to the fifth embodiment.

[Step S61] Because step S61 is the same as step S21 of FIG. 18, the description is omitted.

[Step S62] The SPS communication control unit 66b causes one or more SPS services to be activated in order to start the SPS services. The SPS communication control unit 66b specifies each of the SPS services to be activated using the CIF of a PDCCH. For example, to specify each of the SPS services to be activated, the SPS communication control unit 66b uses the 3-bit bitmap of the CIF.

The transmitting and receiving unit 61 transmits, to the wireless terminal 10, a PDCCH carrying each activation command generated by the SPS communication control unit 66b. Note that, when transmitting the PDCCH with each activation command, the transmitting and receiving unit 61 also transmits corresponding data in the first SPS period to the wireless terminal 10 through the PDSCH.

[Steps S63 to S65] Because steps S63 to S65 are the same as steps S23 to S25 of FIG. 18, the descriptions are omitted.

[Step S66] The SPS communication control unit 66b specifies the SPS service to be released using the CIF of the PDCCH. For example, to specify the SPS service to be released, the SPS communication control unit 66b uses the 3-bit value of the CIF. The transmitting and receiving unit 61 transmits a release command generated by the SPS communication control unit 66b to the wireless terminal 10.

Figure 27:
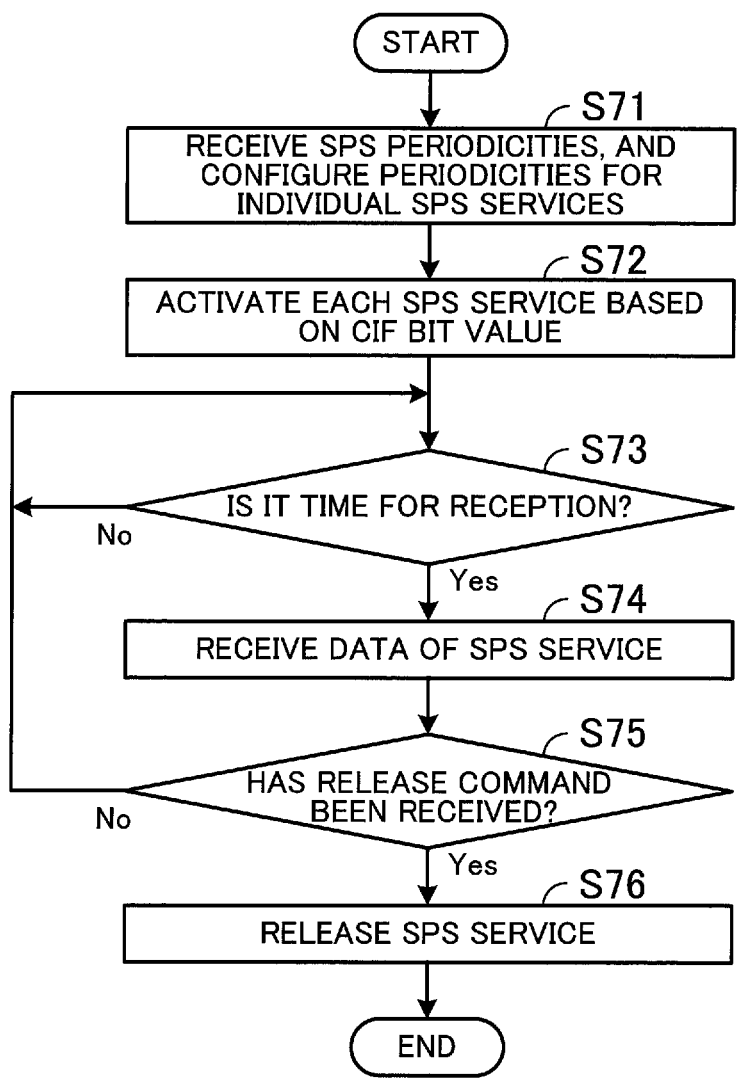
FIG. 27 is a flowchart illustrating downlink SPS operation of a wireless terminal according to the fifth embodiment.

FIG. 27 is a flowchart illustrating downlink SPS operation of a wireless terminal according to the fifth embodiment.

[Step S71] Because step S71 is the same as step S31 of FIG. 19, the description is omitted.

[Step S72] The SPS communication control unit 55b receives one or more activation commands from the base station 20 via the transmitting and receiving unit 51. Based on the received activation commands, the SPS communication control unit 55b activates corresponding SPS services individually. For example, the SPS communication control unit 55b determines an SPS service to be activated based on the 3-bit value of the CIF of each PDCCH. Note that, when receiving a PDCCH carrying an activation command, the transmitting and receiving unit 51 receives corresponding data in the first SPS period through the PDSCH.

[Steps S73 to S75] Because steps S73 to S75 are the same as steps S33 to S35 of FIG. 19, the descriptions are omitted.

[Step S76] The SPS communication control unit 55b releases an SPS service specified by the release command. The SPS service to be released is indicated by the 3-bit value of the CIF.

Note that the above description is directed to downlink SPS operation, however, uplink SPS operation is implemented in the same manner. The uplink SPS operation of the fifth embodiment is the same as, for example, that of the third embodiment although differing in distinguishing each SPS service using the CIF.

As described above, the SPS communication control units 55b and 66b use a bit value of the CIF to distinguish each SPS service, which enables control of a plurality of SPS services with reduced signaling overhead.

(f) Sixth Embodiment

A sixth embodiment is described next in detail with reference to the accompanying drawings. The sixth embodiment uses SPS-CRNTIs to distinguish individual SPS services one from the other. In general, a base station assigns one SPS-CRNTI to a single wireless terminal. On the other hand, according to the sixth embodiment, the base station assigns as many SPS-CRNTIs to a single wireless terminal as the number of SPS services provided. That is, according to the sixth embodiment, one SPS-CRNTI is assigned to a single SPS service to thereby distinguish SPS services to be activated or released.

The wireless communication system according to the sixth embodiment is the same as the one illustrated in FIG. 2. In addition, PDCCH DCI formats are the same as those of FIGS. 7 and 8. That is, in the sixth embodiment, individual SPS services are distinguished with no change in the DCI formats. In addition, the hardware configuration examples of the wireless terminal and the base station of the sixth embodiment are the same as those in FIGS. 12 and 13, respectively. The block diagrams of the wireless terminal and the base station of the sixth embodiment are the same as those in FIGS. 14 and 15, respectively. Note however that the sixth embodiment differs in how the SPS communication control units 55b and 66b distinguish individual SPS services, and the SPS communication control units 55b and 66b use SPS-CRNTIs to distinguish the SPS services.

The communication control unit 66b of the base station 20 generates an SPS-CRNTI for each SPS service to be established. For example, the base station 20 transmits image data and audio data to the wireless terminal 10 using SPS1 and SPS2, respectively. In this case, the SPS communication control unit 66b generates unique SPS-CRNTIs corresponding to each of SPS1 and SPS2. That is, the SPS-CRNTIs are generated to distinguish SPS1 from SPS2. Note that the SPS communication control unit 66b also generates unique SPS-CRNTIs for a plurality of wireless terminals.

The SPS periodicity control unit 66a configures communication periodicities of SPS1 and SPS2 individually. When an RRC connection is established, the SPS communication control unit 66b transmits the SPS-CRNTIs corresponding to SPS1 and SPS2 and the communication periodicities of SPS1 and SPS2 configured by the SPS periodicity control unit 66a to the wireless terminal 10 via the transmitting and receiving unit 61.

The SPS communication control unit 55b of the wireless terminal 10 receives the SPS-CRNTIs and the communication periodicities of SPS1 and SPS2 via the transmitting and receiving unit 51. The SPS communication control unit 55b stores the received SPS-CRNTIs and communication periodicities of SPS1 and SPS2 in a storage device such as a memory.

In order to start individual SPS1 and SPS2, the communication control unit 66b of the base station 20 masks the CRC of each PDCCH carrying an activation command (PDCCH whose fields are set to values for activation, as indicated in FIG. 7) with a corresponding one of the SPS-CRNTIs of SPS1 and SPS2. For example, in order to start SPS1, the SPS communication control unit 66b masks the CRC of a PDCCH carrying an activation command with the SPS-CRNTI of SPS1. The transmitting and receiving unit 61 transmits, to the wireless terminal 10, the PDCCH carrying the activation command generated by the SPS communication control unit 66b.

The SPS communication control unit 55b of the wireless terminal 10 uses an SPS-CRNTI stored in the storage device to de-mask the CRC of the received PDCCH. In the case where the SPS communication control unit 55b is able to de-mask the CRC of the PDCCH and, then, the PDCCH after the de-masking carries an activation command (in the case where the fields on the PDCCH are set to values for activation, as indicated in FIG. 7), the SPS communication control unit 55b activates SPS1 or SPS2 corresponding to the SPS-CRNTI used to de-mask the CRC. For example, if the SPS communication control unit 55b is able to de-mask the CRC using the SPS-CRNTI of SPS1 and, then, the PDCCH after the de-masking carries an activation command, the SPS communication control unit 55b activates SPS1.

In order to release SPS1 or SPS2, the SPS communication control unit 66b of the base station 20 masks the CRC of a PDCCH carrying a release command with the SPS-CRNTI corresponding to SPS1 or SPS2 to be released.

The SPS communication control unit 55b of the wireless terminal 10 uses an SPS-CRNTI stored in the storage device to de-mask the CRC of the received PDCCH. In the case where the SPS communication control unit 55b is able to de-mask the CRC of the PDCCH and, then, the PDCCH after the de-masking carries a release command, the SPS communication control unit 55b releases SPS1 or SPS2 corresponding to the SPS-CRNTI used to de-mask the CRC. For example, if the SPS communication control unit 55b is able to de-mask the CRC using the SPS-CRNTI of SPS1 and, then, the PDCCH after the de-masking carries a release command, the SPS communication control unit 55b releases SPS1.

Uplink SPS services are activated and released in the same manner as described above. The SPS communication control unit 66b generates unique SPS-CRNTIs corresponding to individual uplink SPS services and transmits the SPS-CRNTIs to the wireless terminal 10. If the SPS communication control unit 55b of the wireless terminal 10 is able to de-mask the CRC using an SPS-CRNTI received from the base station 20 and, then, the PDCCH after the de-masking carries an activation command or a release command, the SPS communication control unit 55b activates or releases an SPS service corresponding to the SPS-CRNTI used to de-mask the CRC.

Figure 28:
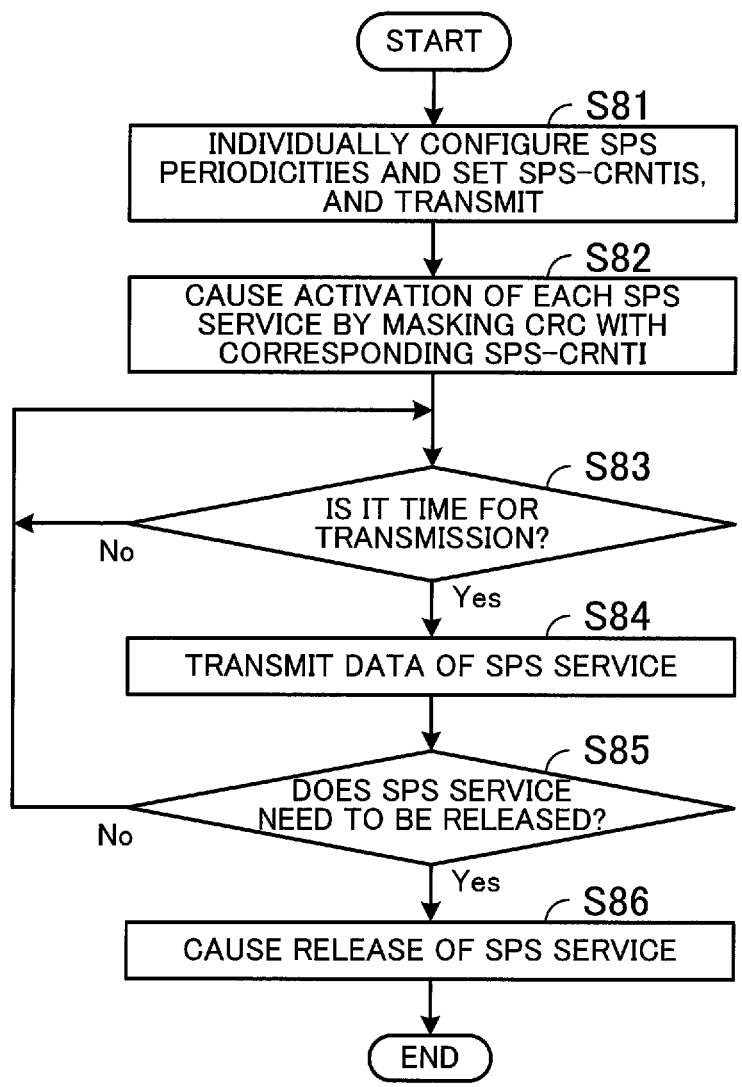
FIG. 28 is a flowchart illustrating downlink SPS operation of a base station according to a sixth embodiment.

FIG. 28 is a flowchart illustrating downlink SPS operation of a base station according to the sixth embodiment.

[Step S81] The SPS periodicity control unit 66a of the base station 20 configures communication periodicities of a plurality of SPS services individually. The SPS communication control unit 66b generates and assigns unique SPS-CRNTIs corresponding to the SPS services. For example, to perform video communication, the SPS periodicity control unit 66a configures communication periodicity of SPS1 for transmitting image data and communication periodicity of SPS2 for transmitting audio data. The SPS communication control unit 66b generates and assigns unique SPS-CRNTIs for SPS1 of image data transmission and SPS2 of audio data transmission. When an RRC connection is established, the SPS communication control unit 66b transmits the SPS-CRNTIs corresponding to SPS1 and SPS2 and the communication periodicities of SPS1 and SPS2 configured by the SPS periodicity control unit 66a to the wireless terminal 10 via the transmitting and receiving unit 61.

[Step S82] The SPS communication control unit 66b causes one or more SPS services to be activated in order to start the SPS services. The communication control unit 66b masks the CRC of each PDCCH carrying an activation command with a corresponding one of the SPS-CRNTIs of SPS1 and SPS2 to be started, to thereby specify SPS1 or SPS2 to be activated. For example, in order to start SPS1, the SPS communication control unit 66b masks the CRC of a PDCCH carrying an activation command with the SPS-CRNTI assigned to SPS1.

The transmitting and receiving unit 61 transmits, to the wireless terminal 10, the PDCCH carrying the activation command generated by the SPS communication control unit 66b. Note that, when transmitting the PDCCH with each activation command, the transmitting and receiving unit 61 also transmits corresponding data in the first SPS period to the wireless terminal 10 through the PDSCH.

[Step S83] The SPS transmission managing unit 65a determines whether it is time to transmit data of one of the activated SPS services based on the communication periodicities configured by the SPS periodicity control unit 66a. If determining that it is time to transmit data of one of the activated SPS services, the SPS transmission managing unit 65a proceeds to step S84. On the other hand, if determining that it is not time to transmit data of one of the activated SPS services, the SPS transmission managing unit 65a repeats the determination process of step S83.

[Step S84] The transmitting and receiving unit 61 transmits data of the corresponding one of the activated SPS services to the wireless terminal 10.

[Step S85] The SPS communication control unit 66b determines whether to cause an SPS service to be released. The SPS communication control unit 66b determines an SPS service to be released, for example, based on the state of the radio channel. Specifically, if the state of the radio channel drops below a threshold value, the SPS communication control unit 66b determines release of an SPS service dealing with image data transmission to thin out image data. If determining release of an SPS service, the SPS communication control unit 66b proceeds to step S86. On the other hand, if determining not to release an SPS service, the SPS communication control unit 66b proceeds to step S83.

[Step S86] In order to release SPS1 or SPS2, the SPS communication control unit 66b masks the CRC of a PDCCH carrying a release command with the SPS-CRNTI corresponding to SPS1 or SPS2 to be released. The transmitting and receiving unit 61 transmits the release command generated by the SPS communication control unit 66b to the wireless terminal 10.

Figure 29:
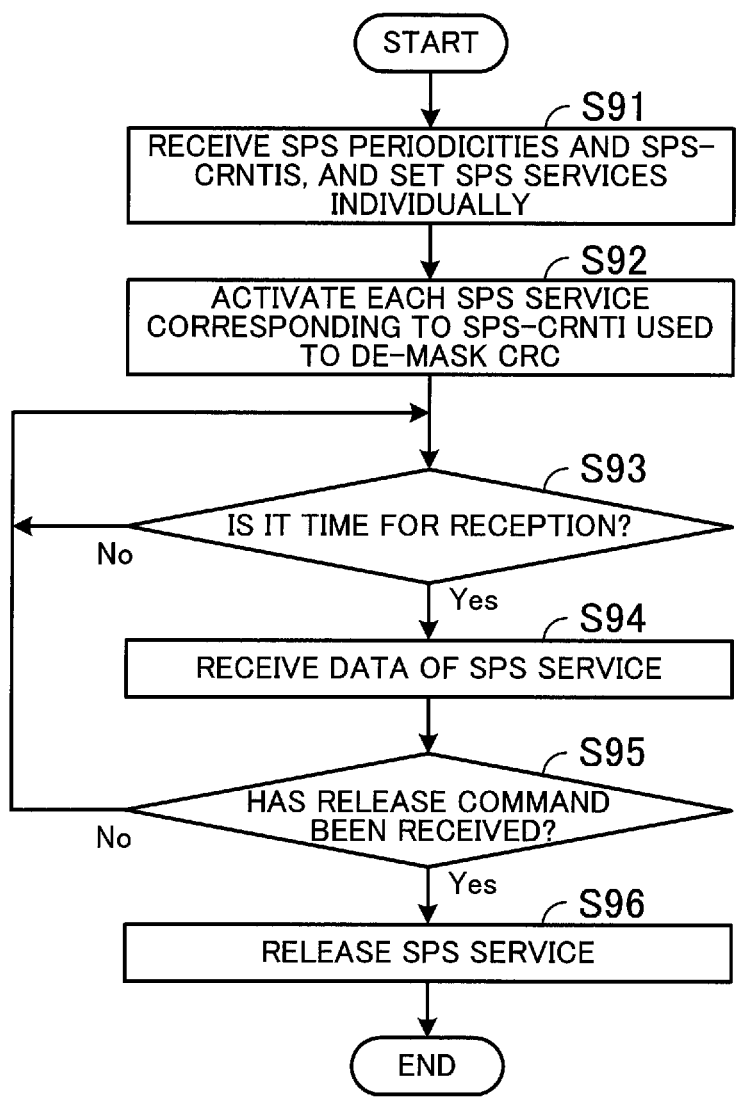
FIG. 29 is a flowchart illustrating downlink SPS operation of a wireless terminal according to the sixth embodiment.

FIG. 29 is a flowchart illustrating downlink SPS operation of a wireless terminal according to the sixth embodiment.

[Step S91] When an RRC connection is established, the SPS communication control unit 55b of the wireless terminal 10 receives communication periodicities of SPS services and SPS-CRNTIs from the base station 20 via the transmitting and receiving unit 51. The SPS periodicity control unit 55a configures the communication periodicities received by the transmitting and receiving unit 51 as SPS communication periodicities. For example, the SPS periodicity control unit 55a stores the received communication periodicities in a memory for managing communication periodicities of a plurality of SPS services. In addition, the SPS communication control unit 55b stores, in a storage device, the received SPS-CRNTIs in association with the SPS services.

[Step S92] The SPS communication control unit 55b uses an SPS-CRNTI stored in the storage device to de-mask the CRC of a received PDCCH. In the case where the SPS communication control unit 55b is able to de-mask the CRC of the PDCCH and, then, the PDCCH after the de-masking carries an activation command, the SPS communication control unit 55b activates SPS1 or SPS2 corresponding to the SPS-CRNTI used to de-mask the CRC. Note that, when receiving the PDCCH carrying the activation command, the transmitting and receiving unit 51 receives data in the first SPS period through the PDSCH.

[Step S93] The SPS transmission managing unit 54a determines whether it is time to receive data of one of the activated SPS services based on the communication periodicities configured by the SPS periodicity control unit 55a. If determining that it is time to receive data of one of the activated SPS services, the SPS transmission managing unit 54a proceeds to step S94. On the other hand, if determining that it is not time to receive data of one of the activated SPS services, the SPS transmission managing unit 54a repeats the determination process of step S93.

[Step S94] The transmitting and receiving unit 51 receives data of a corresponding one of the activated SPS services transmitted from the base station 20.

[Step S95] The SPS communication control unit 55b determines whether a release command has been received via the transmitting and receiving unit 51. The SPS communication control unit 55b uses an SPS-CRNTI stored in the storage device to de-mask the CRC of a received PDCCH. The SPS communication control unit 55b determines reception of a release command based on whether the SPS communication control unit 55b is able to de-mask the CRC of the PDCCH and, then, the PDCCH after de-masking carries a release command. If determining reception of a release command, the SPS communication control unit 55b proceeds to step S96. If not, the SPS communication control unit 55b proceeds to step S93.

[Step S96] The SPS communication control unit 55b releases an SPS service corresponding to the SPS-CRNTI used to de-mask the CRC.

As described above, the SPS communication control units 55b and 66b distinguish a plurality of SPS services using the SPS-CRNTIs of the SPS services, which enables control of the SPS services with reduced signaling overhead.

According to one aspect, it is possible to control a plurality of periodic communication services.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A wireless terminal for wirelessly communicating with a base station, the wireless terminal comprising a processor configured to perform a procedure including:
   performing SPS (Semi-Persistent Scheduling) services which are a plurality of periodic communication services with the base station; and
   controlling at least one of activation and release of each of the SPS services using SPS index information for distinguishing the SPS services one from another, the SPS index information being included in a PDCCH (Physical Downlink Control Channel) transmitted from the base station;
   wherein the PDCCH for downlink activation or release includes a first SPS index field in place of a HARQ (Hybrid Automatic Repeat Request) process number field and the SPS index information is allocated in the first SPS index field;
   wherein the PDCCH for uplink activation or release includes a second SPS index field in place of a Cyclic shift DM RS (demodulation reference signal) field and the SPS index information is allocated in the second SPS index field.

2. The wireless terminal according to claim 1, wherein the procedure further includes controlling the activation and the release of each of the SPS services using the SPS index information, a format of the PDCCH, and a field value of the PDCCH.

3. The wireless terminal according to claim 1, wherein the procedure further includes configuring a plurality of periodicities for the SPS services.

4. The wireless terminal according to claim 3, wherein:
   the periodicities are informed of by the base station when a radio resource control connection is established.

5. The wireless terminal according to claim 1, wherein the procedure further includes controlling at least one of the activation and the release of each of the SPS services based on a corresponding bit of a bitmap, the SPS services been distinguished one from another using the bitmap.

6. The wireless terminal according to claim 1, wherein the procedure further includes controlling at least one of the activation and the release of each of the SPS services based on a bit value, each of the SPS services been distinguished using the bit value.

7. A wireless terminal for wirelessly communicating with a base station, the wireless terminal comprising a processor configured to perform a procedure including:
   performing SPS (Semi-Persistent Scheduling) services which are a plurality of periodic communication services with the base station;
   receiving, from the base station, SPS-CRNTIs (SPS-Cell Radio Network Temporary Identifiers) of the SPS services, each of the SPS-CRNTIs being used to mask a code region for detecting an error in a PDCCH (Physical Downlink Control Channel); and controlling at least one of activation and release of each of the SPS services based on each of the SPS-CRNTIs and the PDCCH received from the base station;

wherein when the base station activates a first SPS service, the base station masks the code region for detecting the error of a first PDCCH carrying an activation command with a first SPS-CRNTI corresponding to the first SPS service to be activated, wherein when the processor is able to de-mask the code region for detecting the error using the first SPS-CRNTI received from the base station, and the PDCCH after the de-masking is the first PDCCH which carries the activation command, the processor activates the first SPS service corresponding to the first SPS-CRNTI used to de-mask the code region for detecting the error in the first PDCCH, wherein when the base station releases a second SPS service, the base station masks the code region for detecting the error of a second PDCCH carrying a release command with a second SPS-CRNTI corresponding to the second SPS service to be released, wherein when the processor is able to de-mask the code region for detecting the error using the second SPS-CRNTI received from the base station, and the PDCCH after the de-masking is the second PDCCH which carries the release command, the processor releases the second SPS service corresponding to the second SPS-CRNTI used to de-mask the code region for detecting the error in the second PDCCH.

8. A base station for wirelessly communicating with a wireless terminal, the base station comprising a processor configured to perform a procedure including:

performing SPS (Semi-Persistent Scheduling) services which are a plurality of periodic communication services with the wireless terminal; and including, in a PDCCH (Physical Downlink Control Channel), SPS index information for distinguishing the SPS services one from another to allow the wireless terminal to control at least one of activation and release of each of the SPS services;

wherein the PDCCH for downlink activation or release includes a first SPS index field in place of a HARQ (Hybrid Automatic Repeat Request) process number field and the SPS index information is allocated in the first SPS index field;

wherein the PDCCH for uplink activation or release includes a second SPS index field in place of a Cyclic shift DM RS (demodulation reference signal) field and the SPS index information is allocated in the second SPS index field.

9. A base station for wirelessly communicating with a wireless terminal, the base station comprising a processor configured to perform a procedure including:

performing SPS (Semi-Persistent Scheduling) services which are a plurality of periodic communication services with the wireless terminal;

generating SPS-CRNTIs (SPS-Cell Radio Network Temporary Identifiers) of the SPS services, each of the SPS-CRNTIs being used to mask a code region for detecting an error in PDCCH (Physical Downlink Control Channel) to allow the wireless terminal to control at least one of activation and release of each of the SPS services; and transmitting each of the SPS-CRNTIs to the wireless terminal;

wherein when the base station activates a first SPS service, the processor masks the code region for detecting the error of a first PDCCH carrying an activation command with a first SPS-CRNTI corresponding to the first SPS service to be activated, wherein when the wireless terminal is able to de-mask the code region for detecting the error using the first SPS-CRNTI received from the base station, and the PDCCH after the de-masking is the first PDCCH which carries the activation command, the wireless terminal activates the first SPS service corresponding to the first SPS-CRNTI used to de-mask the code region for detecting the error in the first PDCCH, wherein the base station releases a second SPS service, the processor masks the code region for detecting the error of a second PDCCH carrying a release command with a second SPS-CRNTI corresponding to the second SPS service to be released, wherein when the wireless terminal is able to de-mask the code region for detecting the error using the second SPS-CRNTI received from the base station, and the PDCCH after the de-masking is the second PDCCH which carries the release command, the wireless terminal releases the second SPS service corresponding to the second SPS-CRNTI used to de-mask the code region for detecting the error in the second PDCCH.

* * * * *